(12) United States Patent
Hoecherl et al.

(10) Patent No.: US 11,593,802 B1
(45) Date of Patent: Feb. 28, 2023

(54) SYSTEMS AND METHODS FOR DESIGNING, DESIGNATING, PERFORMING, AND COMPLETING AUTOMATED WORKFLOWS BETWEEN MULTIPLE INDEPENDENT ENTITIES

(71) Applicant: Domunus Inc., New York, NY (US)

(72) Inventors: Markus Hoecherl, New York, NY (US); Juergen Hoecherl, Munich (DE); Andreas Bruemmer, White Plains, NY (US)

(73) Assignee: DOMUNUS INC., New York, NY (US)

( * ) Notice: Subject to any disclaimer, the term of this patent is extended or adjusted under 35 U.S.C. 154(b) by 393 days.

(21) Appl. No.: 16/913,352

(22) Filed: Jun. 26, 2020

Related U.S. Application Data

(60) Provisional application No. 62/867,340, filed on Jun. 27, 2019.

(51) Int. Cl.
| | |
|---|---|
| *G06Q 20/40* | (2012.01) |
| *G06Q 20/38* | (2012.01) |
| *G06F 16/901* | (2019.01) |
| *H04L 9/06* | (2006.01) |
| *G06Q 10/06* | (2012.01) |
| *H04L 9/00* | (2022.01) |
| *G06Q 10/0633* | (2023.01) |
| *G06Q 10/0631* | (2023.01) |

(52) U.S. Cl.
CPC ......... *G06Q 20/401* (2013.01); *G06F 16/901* (2019.01); *G06Q 10/0633* (2013.01); *G06Q 10/06311* (2013.01); *G06Q 10/06316* (2013.01); *G06Q 20/382* (2013.01); *H04L 9/0643* (2013.01); *H04L 9/50* (2022.05)

(58) Field of Classification Search
CPC .......... G06Q 10/00–50/00; G06F 1/00–30/00; H04L 1/00–69/00
USPC ................................................ 705/7.11–7.42
See application file for complete search history.

(56) References Cited

U.S. PATENT DOCUMENTS

| | | | |
|---|---|---|---|
| 6,850,939 B2 * | 2/2005 | Bostleman | G06Q 10/10 707/999.009 |
| 7,483,841 B1 * | 1/2009 | Jin | G06Q 10/063118 705/7.11 |
| 7,899,679 B2 * | 3/2011 | MacKay | G06Q 20/10 705/7.27 |

(Continued)

*Primary Examiner* — Alan S Miller
(74) *Attorney, Agent, or Firm* — Myers Wolin, LLC

(57) ABSTRACT

A computer-based method is provided for managing a transaction including provision of a process intelligence engine comprising a workflow aligner and process tool box, receiving deal parameters at the process intelligence engine, defining transaction subjects, each requiring the participation of at least one network partner, where each transaction subject is a requirement for achieving the objective of the transaction, defining, for each transaction subject, a plurality of subject goals to be addressed by a network partner, and defining, for each subject goal at least one action item required for satisfying the subject goal. The subject goals are then sequenced by the workflow aligner by defining prerequisites for at least one subject goal and transaction modules are defined based on the sequencing. During execution of a deal using the method, subject goals are not made available until prerequisite subject goals have been completed.

15 Claims, 23 Drawing Sheets

(56) References Cited

U.S. PATENT DOCUMENTS

| | | | |
|---|---|---|---|
| 10,496,557 B1* | 12/2019 | Moore | G06F 16/24562 |
| 11,016,756 B1* | 5/2021 | Moore | G06F 16/23 |
| 2002/0065798 A1* | 5/2002 | Bostleman | G06Q 10/10 |
| 2002/0128890 A1* | 9/2002 | Dick | G06Q 10/06 |
| | | | 705/7.26 |
| 2004/0243640 A1* | 12/2004 | Bostleman | G06Q 10/10 |
| 2006/0069605 A1* | 3/2006 | Hatoun | G06Q 10/0633 |
| | | | 705/7.26 |
| 2007/0143736 A1* | 6/2007 | Moriarty | G06Q 10/06 |
| | | | 715/201 |
| 2007/0245300 A1* | 10/2007 | Chan | G06Q 10/06 |
| | | | 717/104 |
| 2008/0046862 A1* | 2/2008 | Sattler | G06Q 10/06 |
| | | | 717/104 |
| 2009/0248482 A1* | 10/2009 | Knyphausen | G06Q 50/188 |
| | | | 705/26.1 |
| 2010/0223557 A1* | 9/2010 | Kenney | G06Q 10/10 |
| | | | 707/E17.014 |
| 2014/0129585 A1* | 5/2014 | Furniss | G06Q 30/00 |
| | | | 707/765 |
| 2014/0278631 A1* | 9/2014 | Karuppusamy | G06Q 10/06316 |
| | | | 705/7.13 |
| 2014/0351115 A1* | 11/2014 | Dahiwadkar | G06Q 40/025 |
| | | | 705/38 |
| 2018/0374171 A1* | 12/2018 | Aizen | G06Q 50/167 |
| 2020/0127843 A1* | 4/2020 | Webster | H04L 63/102 |

* cited by examiner

Designing Phase

1. Design Overall Transaction Objective
2. Identify participating Transaction Network Partners
3. Identify Transaction Subject and Subject Goals from Network Partner
4. Define Work Required within Subject Goals
5. Identify Individual Partners for Work Required
6. Translate Work Required into Single Actions
7. Assign Individual Partners to Single Actions

Aligning Phase

1. Sequence Subject Goals (incl. Work Required w/ Single Actions)
2. Define Transaction Modules
3. Align Workflow Modules toward Overall Transaction Objective
4. Connect Process Tool Box to Interim Goals Workflows, Actions
5. Compose Start Phase

Operating Phase

1. Connect Process Toolbox with APIs and Software Integration
2. Utilize Process Toolbox to enable Workflow btw. Modules and Partners
3. Utilize Process Tool Box to enable Actions for Partners

Recording Phase

1. Identify Recording Data
2. Define the Recording Process
3. Identify the Evaluation Process

FIG. 1A

SUBJECT GOAL
1510a
Complete Home Inspection Report

WORK REQUIRED
(1) Schedule Visits
(2) Conduct Visits
(3) Upload Reports

SUBJECT GOAL
1510b
Accept Property based on Reports

WORK REQUIRED
(1) Accept Home
(2) Request Repair Work

SUBJECT GOAL
1510c
Pricing Negotiation

WORK REQUIRED
(1) Accept Repair Work
(2) Bidding for Repair Work/Cost

SUBJECT GOAL
1510d
Initiate Repair of Deficiencies

WORK REQUIRED
(1) Quote for Repair Work
(2) Contractor Selection

SUBJECT GOAL
1510x
Accept Property after Work on Deficiencies

WORK REQUIRED
(1) Conduct Final Home Inspection
(2) Submit Report
(3) Accept
(4) Reject Repair Work

SUBJECT GOAL
1510x
Complete Other Inspection Reports

WORK REQUIRED
(1) Schedule Visits
(2) Conduct Visits
(3) Upload Reports and Cost Estimate

SUBJECT GOAL
1510x
Complete Work on Deficiencies

WORK REQUIRED
(1) Conduct Repair Work
(2) Submit Receipts

SUBJECT GOAL
1510x
Legal Acceptance

WORK REQUIRED
(1) Amend Final P&S
(2) Sign
(3) Lender confirmation

SUBJECT GOAL
1510x
Home Insp. Complete

WORK REQUIRED
(1) Schedule Date and Time for Final Closing Procedure
(2) Confirm Final Property Walk and Schedule Date/Time

FIG. 16

SYSTEMS AND METHODS FOR DESIGNING, DESIGNATING, PERFORMING, AND COMPLETING AUTOMATED WORKFLOWS BETWEEN MULTIPLE INDEPENDENT ENTITIES

CROSS REFERENCE TO RELATED APPLICATIONS

This application takes priority from U.S. Provisional Application No. 62/867,340, filed Jun. 27, 2019, the entire contents of which is incorporated herein.

FIELD OF THE INVENTION

The described business method is related to business operations in general and to industry related workflows in particular facilitating task or transaction management for operation, optimization, and security, also incorporating blockchain enabled technology and artificial intelligence.

BACKGROUND

Multi-functional operations between various industries and businesses are vastly complex, non-standardized, and unstructured in terms of task management, task assignment, task execution, and task validation.

Existing transactional operations in various industries utilize different processes, communication strings, and security standards largely incompatible across the industries and businesses involved resulting in timely, costly, and unstructured transaction flow results.

Isolated business operations already utilize simplified digital transaction tools in their specific industry e.g. digital real estate and mortgage lending tools. However, existing tools are not functional across additional industries to facilitate the completion of a cross-functional transaction. E.g.: while the mortgage lender utilizes a mortgage lending tool to sell a mortgage no tool exist to support the home buyer and seller in the process of closing the real estate transaction by incorporating other necessary partners, like attorneys, title insurers, appraisers, or others as relevant network participants for a transaction.

The existing management tools simplify and ease transactional processes by way of static informational dashboards which only support the project- or task management aspect of the transaction but not the automation of the entire process itself.

The lack of a multi-functional and cross-business transaction tool increases transaction time and decreases productivity for network participants leading to less efficient operations for all participants.

Existing transactional software programs typically fill market needs for either (1) the automation of specific business needs which are executed through internal workflow channels, e.g. credit card transactions, where the single "host", the creditor, allows the single consumer, the creditee, to draw a line of credit without any further transaction participants or other process tools, other than the internal processing of the credit. Or for (2) the ease and higher efficiency of users offering web-based and static task management tools for manual use, e.g. real estate brokers, using various software programs as project managements tools to follow the external closing processes.

Various individual parts for the claimed method are available, but not in the structure, complexity, and interconnectivity needed for complex cross-network business operations.

Even though individual parts of business solutions exist for designing and depicting transactional operations within one industry, these solutions are not designed to function across various industries to facilitate a cross-network transaction, nor are they designed for simple usage by an end-user.

Existing workflow software (e.g. process maker, etc.) typically fill the market needs for providing a tool for software engineers targeted to design a specific workflow for a business. These are built for experts in the IT area but are not usable for an end-user. The engineer has to (1) create a map for all business-related requirements and then (2) use the workflow software to design a simple workflow.

While the specific aspects of the workflow can be handled by a knowledgeable person, these programs have an inherent lack of guidance since they do not function across industries or are not designed for providing guidance since they are built for IT specialists. As a result, users are required to have deep knowledge in the fields of BPMN (Business Process Model and Notification) as well as in programming.

For example, the entire system or application may only relate to the process creation aspect itself without any reference to the execution of the process or any other relevant aspect for completing an entire complex transaction cycle.

Consumer satisfaction is highest when digital processing exists and personal interaction with a representative remains available.

Parties executing deals are typically concerned with reducing costs, accessing the best technology, and continuing to comply with regulations. Such parties must also deal with transactions that are overly complicated due to a large number of distinct parties that must be coordinated.

Existing products only relate to some small portions of a transaction. Accordingly, they are not, and cannot, be integrated into a transaction network, they cannot be synchronized with each other to create coherent workflows, and they cannot be made fully transparent. Accordingly, workflows cannot be automated and executed in a single platform, nor can they be optimized in relation to each other.

This results in slower transactions and more consumer frustration. Further, because time is expensive, transactions are more expensive. Further, it is difficult to verify the overall process, since no single system can provide secure verification of more than one subcomponent of the process.

There is a need for a single coherent platform that can optimize and simplify a complete transaction workflow, while integrating multiple systems to create a coherent and consistent user experience. Such a platform should decrease the time of a transaction, accelerate the velocity per transaction, thereby increasing the volume of transactions per time, reduce the cost per transaction, and provide immutable and secure verification of transactions.

SUMMARY

Disclosed herein is a method and system for designing, designating, and performing automated workflows between multiple entities thus facilitating, optimizing and automating complex transaction cycles by utilizing a single platform to complete the transaction cycle between multiple independent transaction networks.

A method is provided allowing the user to combine and make use of the core business practices of multiple independent network partners in one single business method by facilitating and enhancing each single core business practices of the participating network partners utilizing the described multifunctional process intelligence engine Also provided are systems and platforms implementing the methods described. It is noted that although the method is described in the context of specific industries, it is contemplated that the method could be used for managing transactions in a wide variety of contexts.

As one example, an embodiment of the method is contemplated for allowing individual users functioning as part of a transactional network, such as brokers within the real estate brokerage industry, to expand their core business by utilizing single source direct access to other network partners and thus decreased transaction time of business network partners involved in the relevant process and increasing transaction volume.

As another example, an embodiment of the method is contemplated for allowing the legal business as user or part of the transactional network of another user to expand its core business of legal services by utilizing single source direct access to other network partners and thus a larger customer base resulting in decreased transaction time and increased legal service volume.

A method allowing any network partner to maintain the confines of their core business while simultaneously allowing them to expand their practices and services into areas of other businesses and industries by participating in a network of partners utilizing the multifunctional process intelligence engine thus mitigating individual business expansion risks and facilitating individual business expansion opportunities into other business sectors or industries.

A method allowing the user to create, modify, and assign one or multiple tasks for a transactional process across multiple network partners utilizing the described process intelligence engine that (1) connects, aligns, and optimizes (workflow aligner component), and (2) automates and completes (process tool box component) verifiable transactional workflows between multiple entities within any transactional environment. Verification of the transactional workflows may be by way of a recordation module provided as part of the process tool box.

In some embodiments, the method is modified such that the workflow alignment component as part of the process intelligence engine allows the transaction host to create and invite relevant transaction network partners, establish a secure and verifiable communication platform between the transaction host and the transaction partners, and enables the transaction host to identify, create, and assign pre-determined workflow tasks for all network participants.

In some embodiments, the method is modified wherein the process tool box component as part of the process intelligence engine functions as the facilitator for the workflow alignment and the completion of workflow actions by the transaction network using automated functions for task execution, blockchain technology for security and verifiability, and analytic technology for feedback and optimization.

In some embodiments, the method is modified wherein the process tool box as part of the process intelligence engine integrates and interconnects multiple coexisting digital tools needed for the completion of the transaction cycle, including, but not limited to, account management, database, finance/payment system, scheduling manager, bidding platform, and communications. The interconnection for these digital tools is one of the basic elements for the functionality, the automation and guidance, during the completion of the transaction cycle.

In some embodiments, the method is modified wherein all activities including workflows from network participants and workflows within the process intelligence engine use blockchain enabled ledger technology to create an immutable ledger system to provide security and verifiability for compliance across the network.

In some embodiments, a computer-based method is provided for managing a transaction including provision of a process intelligence engine comprising a workflow aligner and process tool box. The process intelligence engine then receives deal parameters, the deal parameters defining an objective of the transaction and at least two direct parties to the transaction.

The method then defines a plurality of transaction subjects, each requiring the participation of at least one network partner, where each transaction subject is a requirement for achieving the objective of the transaction.

The method then defines, for each transaction subject, a plurality of subject goals to be addressed by the at least one network partner, and defines, for each subject goal at least one action item required for satisfying the subject goal. Each defined action item is associated with at most one network partner.

The method then identifies, for at least one subject goal, at least one prerequisite subject goal that must be completed before beginning the corresponding subject goal. The subject goals are then sequenced by the workflow aligner such that at least one secondary subject goal of the plurality of subject goals is not accessible to users or network partners until completion of any prerequisite subject goals associated with the secondary subject goal.

The method then defines transaction modules based on the sequencing, with each transaction module comprising a plurality of subject goals.

During execution of a deal using the method, upon completion of a first subject goal, the method identifies a network partner associated with an action item of a second subject goal for which the first subject goal was a prerequisite, and alerts the network partner of the corresponding action item using a communication module of the process tool box.

In some embodiments, the sequencing of the plurality of subject goals comprises defining a sequence relationship between all possible pairs of subject goals of a particular transaction module as either consecutive or parallel. For each consecutive pair of subject goals, one such subject goal is defined as a prerequisite associated with the other subject goal. In some such embodiments, upon completion of any subject goal, the method identifies any subject goals for which all prerequisites have been satisfied and alerts, by way of the communication module, any network partner associated with a first action item for each identified subject goal that the corresponding action item is available for completion.

If, during execution of the method, the process intelligence engine determines that no network partner is associated with a particular action item, and the action item requires input from a third party, at least one of the two direct parties may associate a network partner with the corresponding action item using the communication module.

Typically, a subject goal comprises a plurality of sequenced action items. Accordingly, during execution, upon completion of each action item, any network partner associated with an immediately following action item is alerted by the communication module that the corresponding action item is available for completion. Typically, any subject goal is defined as complete upon the completion of all action items of the corresponding subject goal.

Typically, upon receiving an alert for a particular action item, a network partner is provided with limited access to the transaction, and upon indicating completion of the corresponding action item, the limited access to the transaction is withdrawn from the network partner.

Upon completion of all subject goals of a particular transaction module, the method typically defines the particular transaction module as complete.

In some embodiments, a particular subject goal may define at least one secondary subject goal as complete in the event that an outcome defined in the subject goal renders the corresponding secondary subject goal as moot.

In some embodiments, the process tool box comprises a recordation module for maintaining records of the transaction, and upon completion of any subject goal, a record of such completion is generated by the recordation module and is stored in a document management system. In such embodiments, the document management system may maintain a database of data collected by way of the recordation module and the method may further comprise analyzing the data in the database to identify potential interaction opportunities between network partners.

In some embodiments, the method further comprises sequencing, by the workflow aligner, the plurality of transaction modules by defining a sequence relationship between any pair of transaction modules as either consecutive or parallel, wherein for each consecutive pair of transaction modules, one such transaction module is defined as a prerequisite to the other transaction module. In such embodiments, a specified transaction module is typically not accessible to users until the completion of all prerequisite transaction modules for the specified transaction module. Typically, a transaction module is defined as complete upon the completion of all subject goals of the corresponding transaction module.

In some embodiments, the transaction subjects are defined in the deal parameters or by one of the at least two direct parties to the transaction. The transaction modules are generated by the process intelligence engine, and the transaction modules contain different groupings of subject goals than the transaction subjects.

In some embodiments, the transaction is a real estate transaction between two direct parties, and the network partners include at least one attorney, at least one home inspector, and at least one mortgage lender.

In such an embodiment, a first transaction module may be a real estate property inspection subject, and subject goals include completion of an inspection report and initiating repairs of deficiencies. Completion of the home inspection report may comprise action items for scheduling visits by a home inspector, confirming the home visit by a direct party, conducting and confirming the home visit by the home inspector, conducting payment for the home visit by a direct party, and submission of a report by the home inspector.

In such an embodiment, the completion of the home inspection report may be the first subject goal and the initiating of repairs of deficiencies may be a secondary subject goal, and upon completion of all action items of the first subject goal, a network partner associated with a first action item of the initiating of repairs of deficiencies is identified and alerted of the corresponding action item.

In such an embodiment, a second transaction module may be a mortgage module and a third transaction subject may be a final closing subject, and the mortgage module may then be a prerequisite of the final closing subject, such that the final closing subject and any subject goals associated with the final closing subject are inaccessible until the completion of the mortgage module.

In such an embodiment, the first transaction module may comprise at least one subject goal of the first transaction subject and at least one subject goal of a second transaction subject.

BRIEF DESCRIPTION OF THE DRAWINGS

FIGS. 1A-B are general schematic diagrams illustrating the method of this disclosure in the context of a complete deal execution framework.

FIG. 16 illustrates a definition of multiple subject goals and underlying work tasks for a real estate transaction subject in the context of the automated workflow of FIG. 2.

DETAILED DESCRIPTION OF THE PREFERRED EMBODIMENTS

Figure 1B:
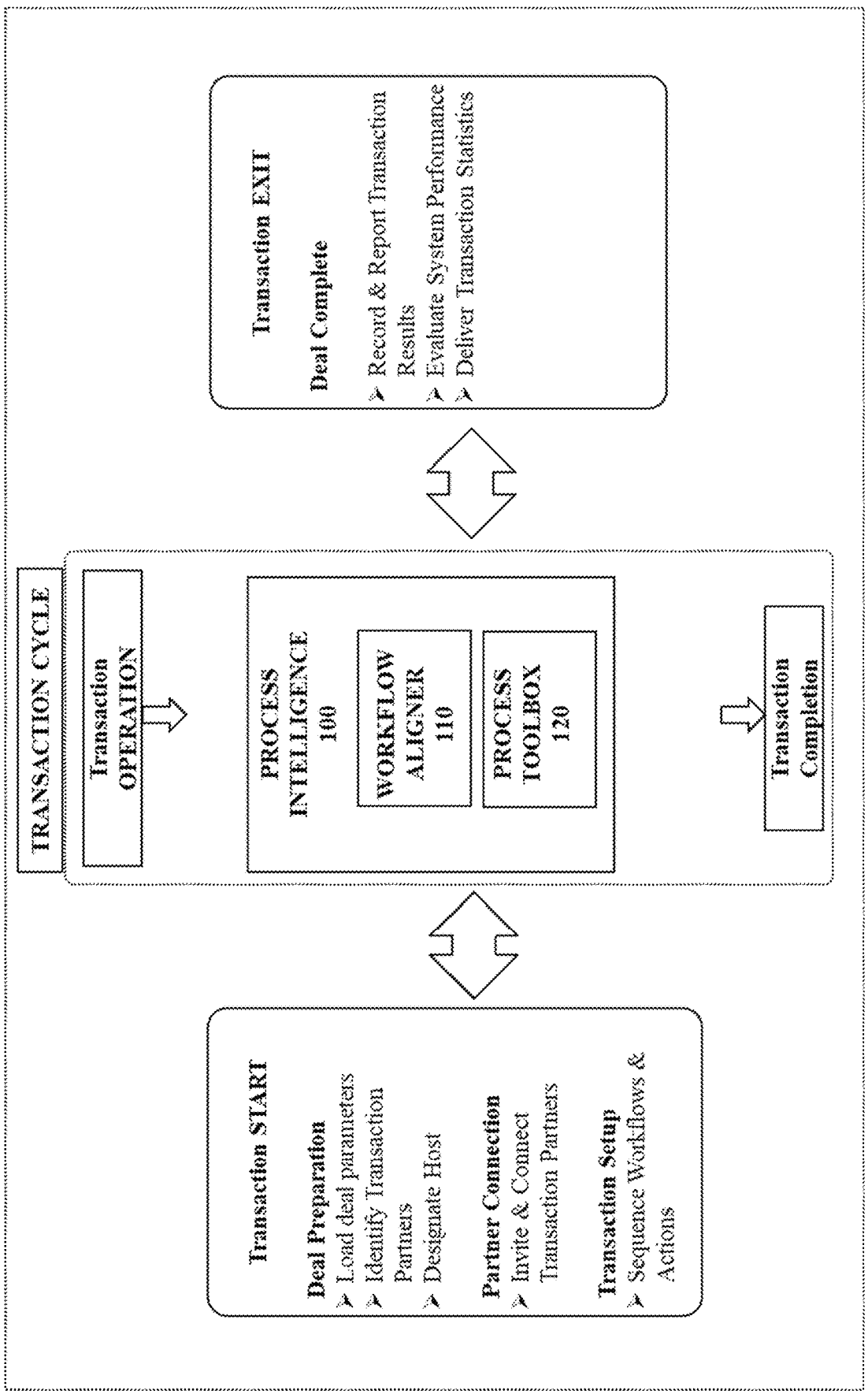

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Generally, systems and methods are provided for allowing the user to combine and make use of the core business practices of multiple independent network partners in one single business method by facilitating and enhancing each single core business practices of the participating network partners utilizing the described multifunctional Process Intelligence machine.

The method shown is for designing, designating, performing, and completing automated workflows between multiple independent entities. The process intelligence engine shown can be adjusted and modified based on the business method and set-up and according to industry needs and challenges, company specific requirements, and workflow restrictions.

FIGS. 1A-B provide general schematic diagrams illustrating the method of this disclosure in the context of a complete deal execution framework. As shown in FIG. 1A, the process intelligence associated with the system described involves designing a complex transaction by defining granular components of the transaction and then aligning those granular components. The process intelligence engine then executes the deal in an operating phase and records all outcomes of the execution.

As shown in FIG. 1B, the process intelligence engine typically comprises a workflow aligner which aligns and optimizes components of a deal.

Figure 2:
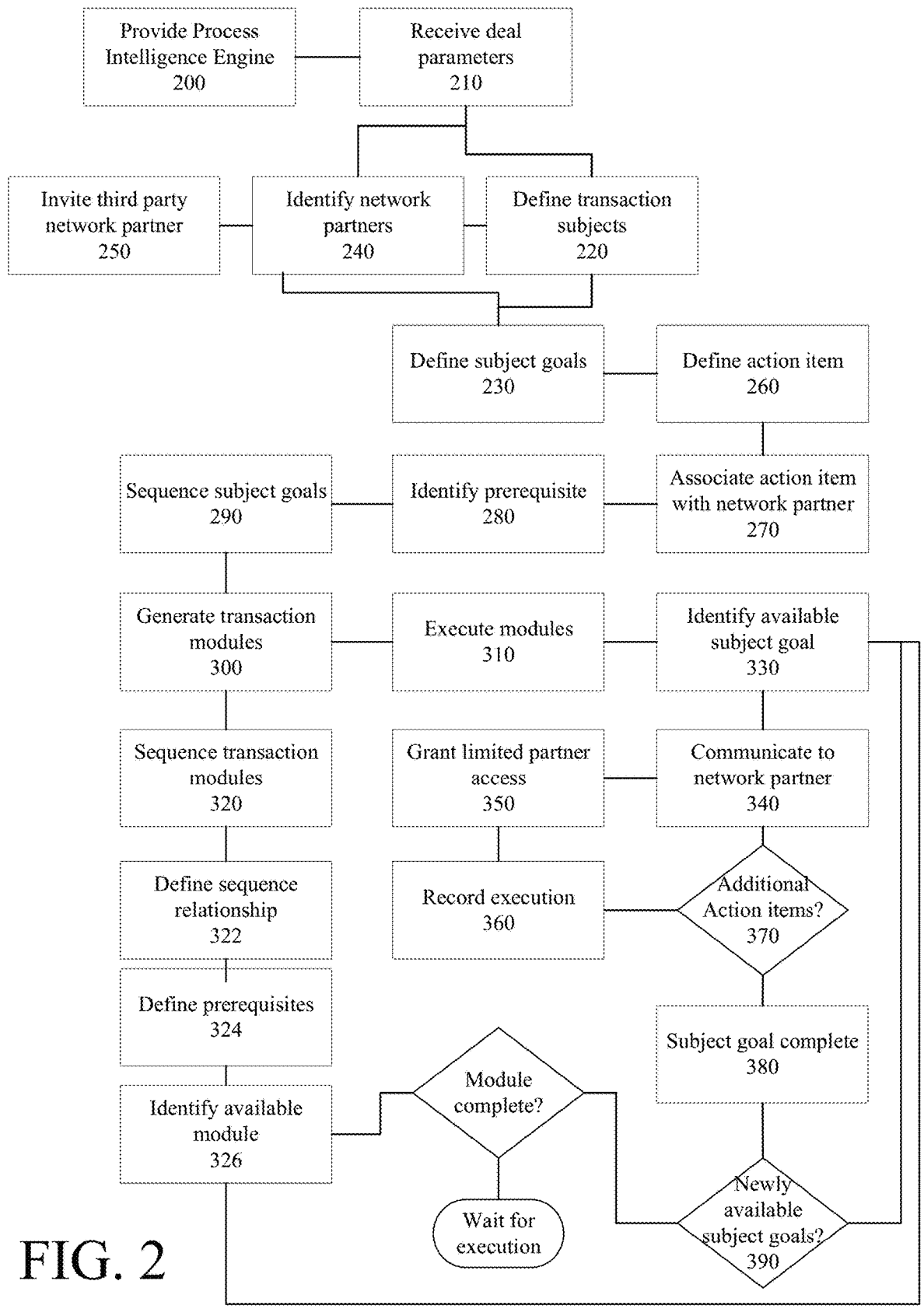
FIG. 2 is a flowchart illustrating a method for designing and completing an automated workflow for a transaction.

FIG. 2 is a flowchart illustrating a method for designing and completing an automated workflow for a transaction. FIGS. 3-13 illustrate detailed implementations of various steps of the flowchart of FIG. 2.

As shown, the computer-based method for managing the transaction comprises first providing (200) a process intelligence engine 100. Such a process intelligence engine 100 is shown generally in FIG. 1B, and typically includes a workflow aligner 110 and a process tool box 120. The process intelligence engine 100 may be a software module executed on a processor. Accordingly, when discussing the receipt of or execution of a task by the process intelligence engine 100, it will be understood that such a task may be performed by a processor or computer implementing the process intelligence engine.

A system executing the method then receives (210), at the process intelligence engine 100, deal parameters. The deal parameters typically define an objective of a deal to be executed, such as the acquisition of a property, and at least two direct parties 130*a, b* to the transaction. In one example, discussed in more detail below, the two parties may be a buyer and seller in a real estate transaction. The objective may then be the acquisition of a property. The deal parameters may further define an object or unit of transaction. In the case of a real estate transaction, this may be a particular building or parcel of land.

After receiving deal parameters, a plurality of transaction subjects 400 are defined (220), with each transaction subject requiring the participation of at least one network partner 450*a-f*. These transaction subjects 400 typically correspond to groupings of tasks that must be performed in order to advance the transaction towards the deal objective. Accordingly, each transaction subject 400 defined is a requirement for achieving the objective of the transaction. For example, in the context of a real estate transaction, such a transaction subject 400 may be the performance of a home inspection.

The transaction subjects may be defined based on a template provided with the deal parameters, or may be defined by one of the two direct parties to the transaction. Alternatively, one of the network partners 450*a-f* may be identified first, and the network partners may provide details of transaction subjects 400 corresponding to their expertise.

Figure 3:
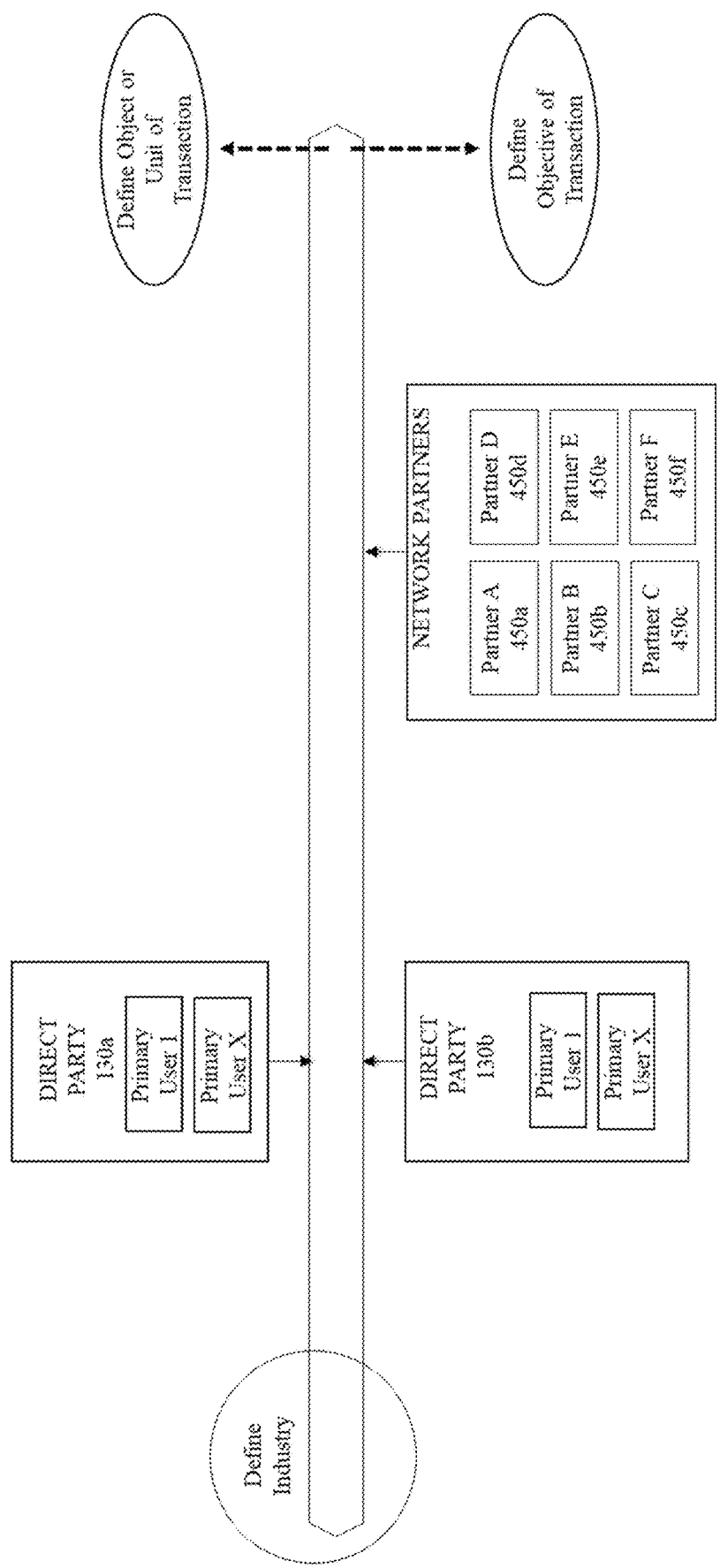
FIG. 3 illustrates a step of identifying network partners for the automated workflow of FIG. 2.

FIG. 3 illustrates a step of identifying network partners 450*a-f* for the automated workflow of FIG. 2. Each network partner 450*a-f* may have distinct expertise associated with a different transaction subject, and may therefore provide details of the corresponding transaction subject. It is understood that in may respect, the direct parties 130*a, b* may function as network partners to the extent that they may be assigned action items for completion, as discussed in more detail below.

Figure 4:
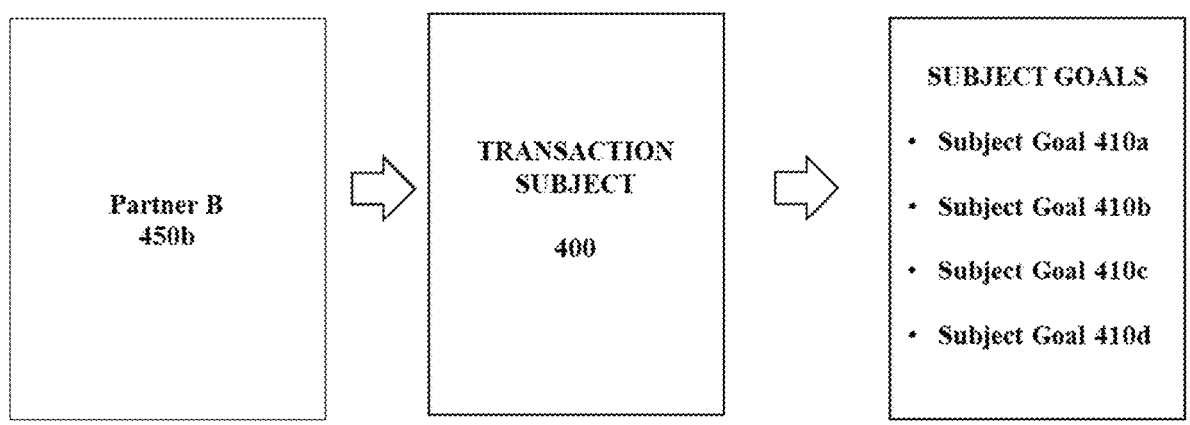
FIG. 4 illustrates a definition of transaction subjects in the context of the automated workflow of FIG. 2.

FIG. 4 illustrates a definition of transaction subjects 400 in the context of the automated workflow of FIG. 2. As shown, each transaction subject may be defined by, or an appropriate template may be provided by, a corresponding network partner, such as partner B 450*b*. Typically, the set of transaction subjects 400 defined at this stage are sufficient achieve the objective of the transaction, such that when all transaction subjects are completed, the objective of the transaction has been completed.

Returning now to the flowchart of FIG. 2, as part of the definition of the transaction subjects 400 (at 220) the method includes defining (230), for each transaction subject 400, a plurality of subject goals 410a-d required for completing the associated transaction subject. Typically, once all subject goals 410a-d associated with a particular transaction subject 400 are complete, the corresponding transaction subject is complete.

Each of the subject goals 410a-d underlying a particular transaction subject 400 would typically be initially associated with the corresponding network partner 450b. However, the network partner 450b or one of the direct parties 130a, b, may identify (240) additional network partners 450 within the system necessary for execution of a particular subject goal 410. Similarly, the network partner 450b may address a particular subject goal 410a by identifying a direct party 130a, b or network partner 450a-f to whom the corresponding subject goal should be retasked.

In some embodiments, a subject goal 410a may be identified for which no existing network partner 450a-f is appropriate. In such a case, a direct party may identify an additional third party network partner not already in the system to be invited (250) to participate in the contemplated transaction, thereby becoming one of the network partners 450a-f within the system. This invitation may be by way of a communication module included in the process tool box 120, discussed in more detail below.

After subject goals 410a-d sufficient to complete any particular transaction subject 400 have been defined, at least one work task 500 is defined (260) for each subject goal 410a-d. Each work task 500 would typically then be associated (270) with one or more network partner 450 or direct party 130a, b. It is noted that work tasks 500 correspond to tasks necessary for the completion of a particular subject goal 410a-d, and may occasionally be referred to as work required for such completion.

Figure 5:
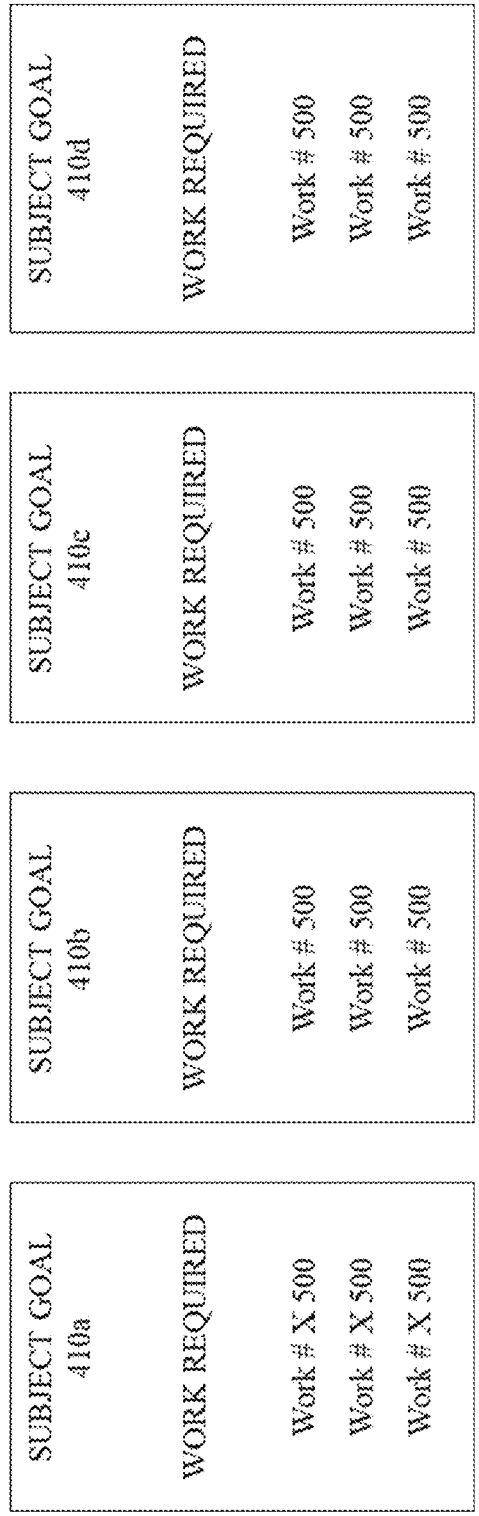
FIG. 5 illustrates a definition of multiple subject goals and underlying work tasks for a transaction subject in the context of the automated workflow of FIG. 2.
Figure 6:
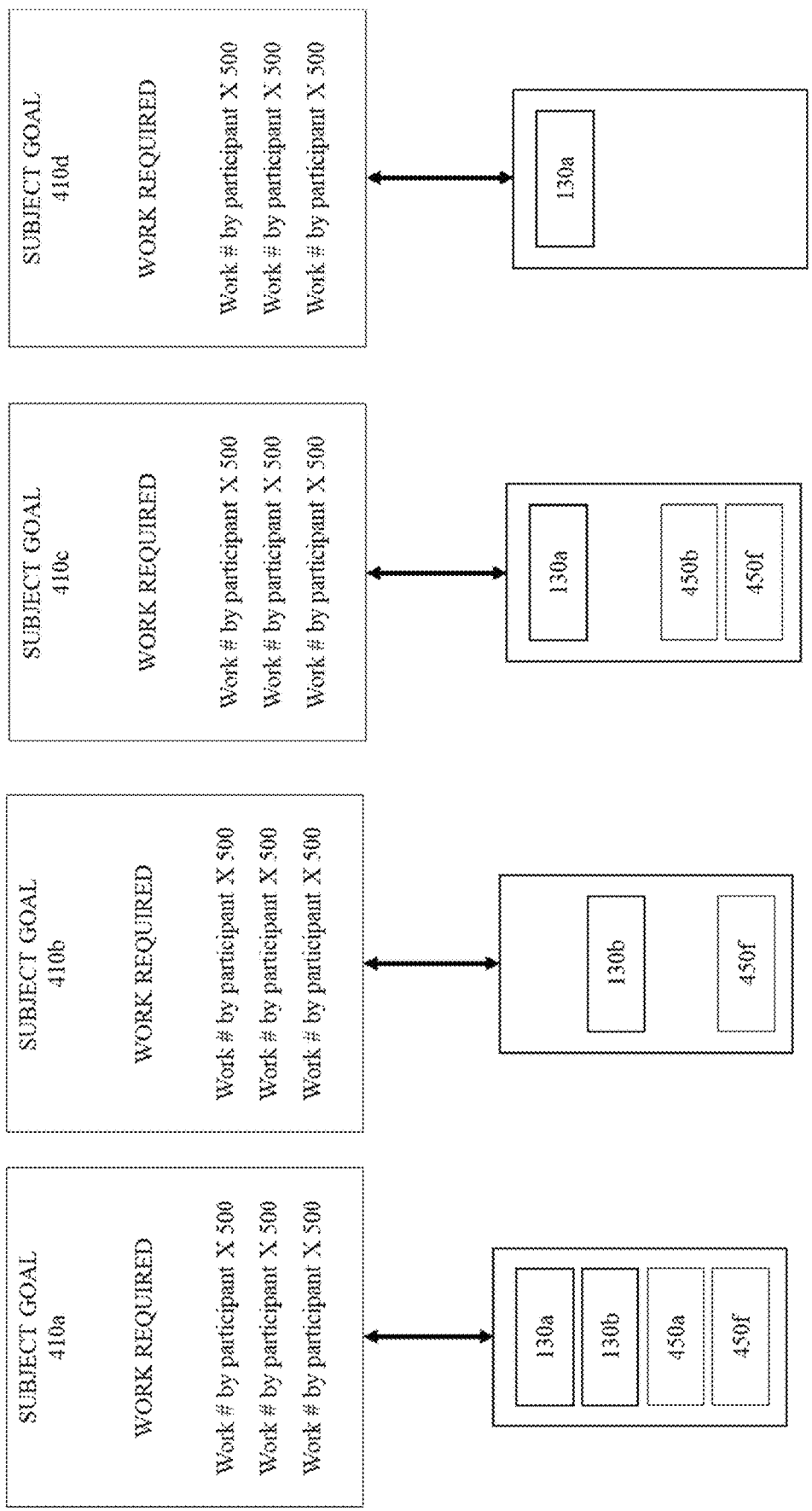
FIG. 6 illustrates a definition of particular network partners for particular subject goals in the context of the automated workflow of FIG. 2.

FIG. 5 illustrates a definition of multiple subject goals 410a-d and underlying work tasks 500 for a transaction subject 400 in the context of the automated workflow. The association of particular network partners 450a-f with particular work tasks 500 may take the form of two distinct steps, as discussed above. Initially any network partners 450a-f or deal parties 130a, b necessary for execution of a particular subject goal 410a may be identified and associated with the corresponding subject goal (at 240). FIG. 6 illustrates a definition of particular network partners 450a-f for particular subject goals 410a. Alternatively, in some embodiments, the work tasks 500 may be defined first and network partners 450a-f may be assigned directly to those work tasks.

In some embodiments, prior to assignment of individual tasks to network partners 450a-f, a further division of work tasks 500 into more granular action items 800 is required. As shown, when a subject goal is broken down into work tasks 500, some such tasks may still require multiple parties for execution. In such a scenario, each work task may be broken down into more granular action items 800 until each defined action item is associated with only a single network partner 450a-f or direct party 130a, b.

Figure 7:
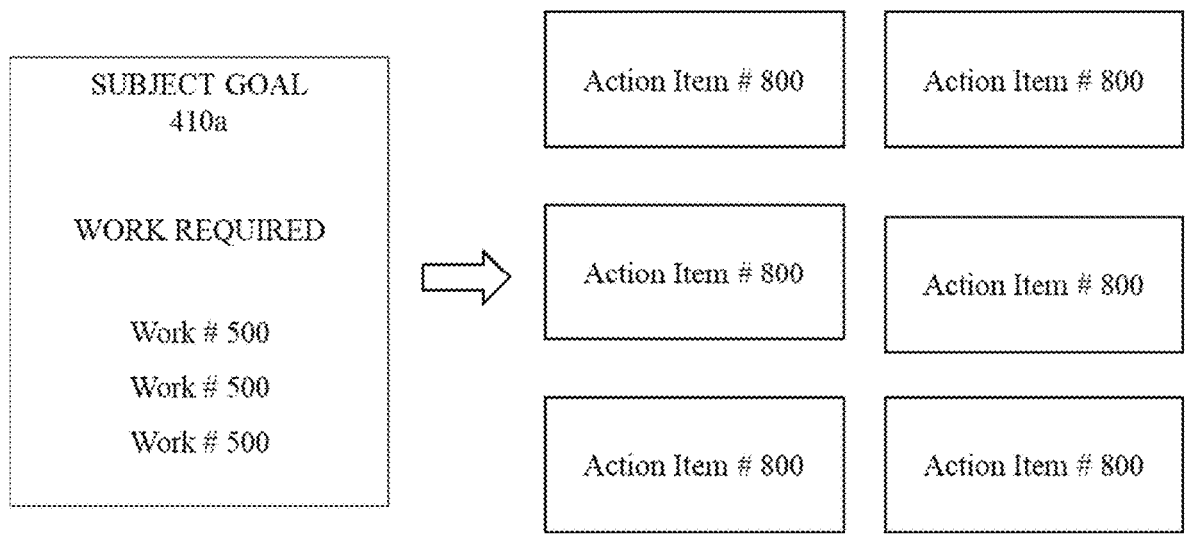
FIGS. 7 and 8 illustrate the definition of particular action items corresponding to work tasks for a particular subject goal and the assignment of network partners or direct parties to particular action items in the context of the automated workflow of FIG. 2.
Figure 8:
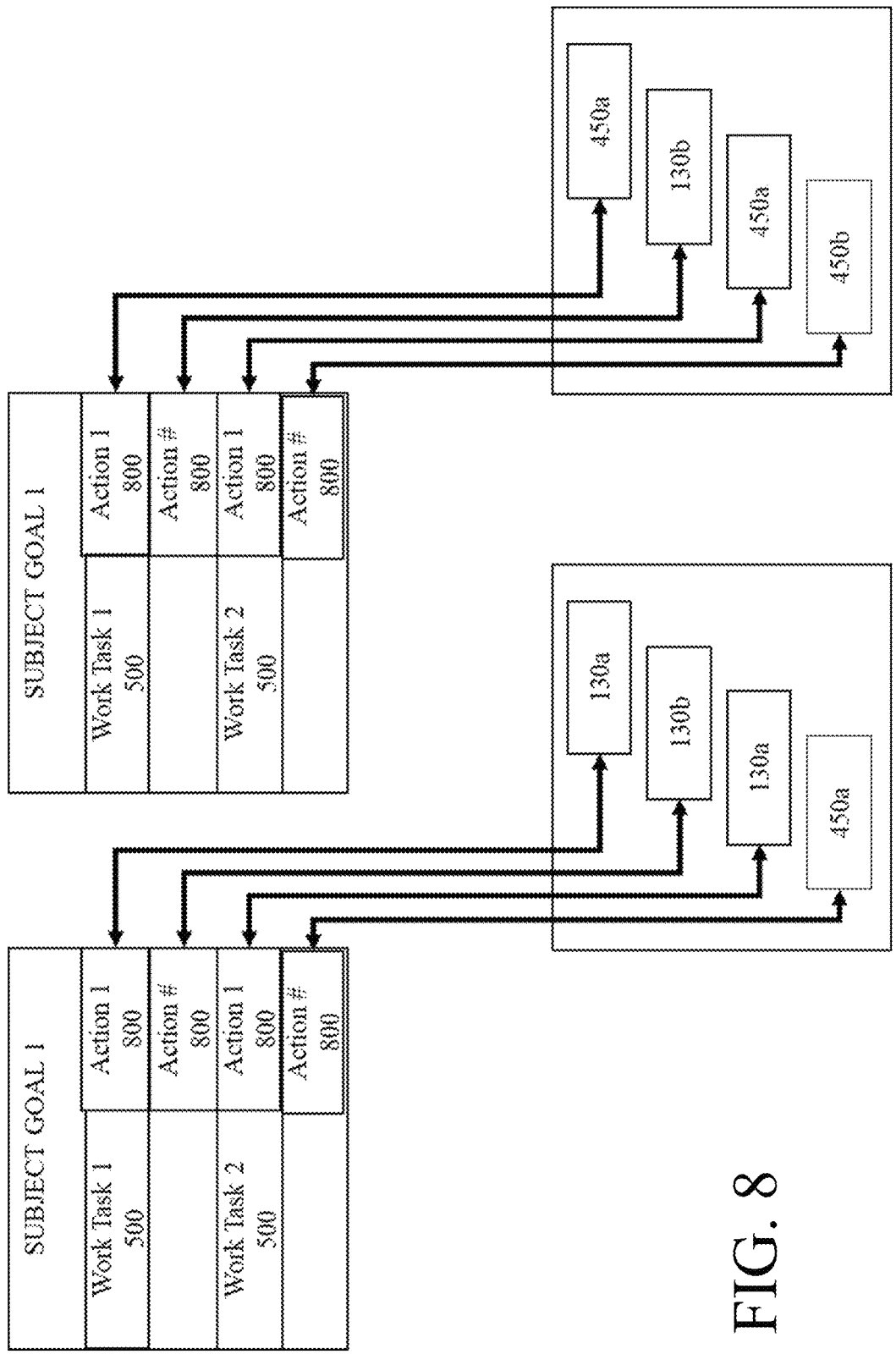

Accordingly, once action items 800 for each subject goal 410a-d have been defined such that each action item can be tasked to a single network partner 450a-f or direct party 130a, b, and once subject goals are associated with corresponding network partners 450a-f and deal parties 130a, b, particular network partners or deal parties may be associated with specific action items 800 defined in the corresponding subject goal (at 270). FIGS. 7 and 8 illustrate the definition of particular action items 800 corresponding to work tasks 500 for a particular subject goal 410a-d and the assignment of network partners 450a-f or direct parties to particular action items 800 for a particular subject goal 410. As such, during execution, a single party necessary for execution of a particular action item 800 may be alerted upon the availability of an action item 800, and may therefore advance the corresponding deal.

Returning now to FIG. 2, after all action items 800 have been defined such that each action item is associated with at most one network partner 450a-f or direct party 130a, b, the method then identifies (280) for at least one subject goal 410b a prerequisite subject goal, such as 410a, that must be completed before beginning the corresponding subject goal.

Accordingly, all subject goals 410a-d previously defined, as well as any further subject goals 410e-g and 410x are analyzed to determine which other subject goals must be completed before execution of the particular subject goal 410a being analyzed can be executed. It is noted that subject goals 410x represent a variety of goals in the method described, and are assigned a single reference number for ease of reference. For example, returning to the real estate transaction sample deal noted above and discussed in more detail below, prior to a party to the deal accepting property based on an inspection report, such an inspection report must have been completed. Accordingly, the completion of an inspection report may be a subject goal that is a prerequisite to the acceptance of the property by a direct party.

Figure 9:
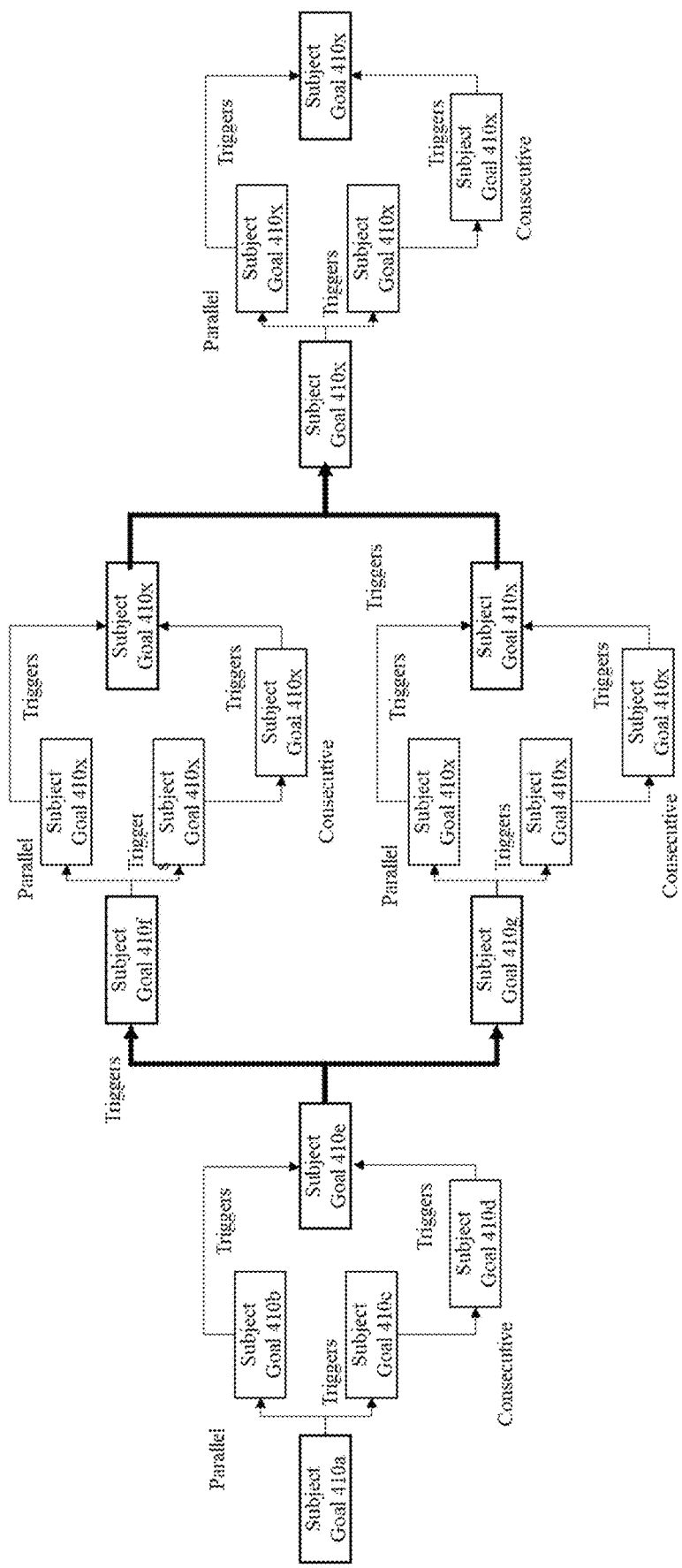
FIG. 9 illustrates the definition of relationships between subject goals in the context of the automated workflow of FIG. 2.

FIG. 9 illustrates the definition of relationships between subject goals 410a-g, x. All subject goals 410a-g, x may be associated with each other subject goal as either consecutive or parallel subject goals. In the case of consecutive subject goals, a first subject goal 410a of the pair is a prerequisite for a second subject goal 410b of the pair. In the case of parallel subject goals 410b, c, there is no prerequisite requirement between the two subject goals, and they may be executed simultaneously.

It is noted that in some cases of parallel subject goals 410b, c may be provided with prerequisites, such as 410a such as the completion of an unrelated goal. Further, some examples of parallel subject goals, such as 410b and 410d may be provided with different prerequisites, such that the action items 800 of two distinct subject goals 410b, d may be presented to corresponding network partners 450a, b simultaneously, or they may be presented at different times depending on when their respective prerequisite subject goals 410a, c have been completed. Accordingly, in the example shown, subject goal 410b will be presented to a corresponding network partner 450a immediately upon completion of subject goal 410a, while subject goal 410d will not be presented for execution until the completion of additional subject goal 410c.

It will be understood that in this discussion, when indicating that a subject goal is presented to a party, such as for execution, an action item underlying the particular subject goal could instead be presented to the corresponding party.

Returning to FIG. 2, in this way, the workflow aligner 110 sequences (290) the plurality of subject goals 410a-g, x. After such sequencing, subject goals 410a-g, x for which prerequisites have not been satisfied may not be presented to corresponding network partners 450a-f or deal parties 130a, b for execution. For example, as shown in FIG. 9, subject goal 410e is a prerequisite for subject goals 410f and g. Accordingly, the action items underlying subject goals 410f and g would not be presented to corresponding network partners 450a-f until the completion of subject goal 410e. As such, at least one secondary subject goal, such as subject goal 410b, may not be accessible to any network partner 450a-f or direct party 130a, b until the completion of any prerequisite subject goal associated with the secondary subject goal.

It is noted that once the subject goals 410a-g, x have been aligned in this way, they are no longer necessarily associated with the transaction subject 400 initially defined. Accordingly, all subject goals 410a-g, x required for deal execution as a whole are reorganized into a network of defined prerequisites and parallel tasks, as shown in FIG. 9.

Once the workflow aligner 110 has completed the sequencing of the subject goals 410a-g, x (at 290), the workflow aligner generates (at 300) a plurality of transaction modules 1000x-z based on the sequencing of the subject goals. The transaction modules 1000x-z defined represent groupings of subject goals 410 required for completing a particular task necessary for advancing the deal towards the transaction objective. Because subject goals 410a-g, x from a first transaction subject may be prerequisites for subject goals from a second transaction subject, the logical groupings defined as transaction modules 1000x-z by the workflow aligner do not correspond to the subject goals originally defined under specified transaction subjects 400. In this way, the transaction subjects 400 are initially generated within the organizational scheme defined by the deal parameters, the network partners 450a-f, or the deal parties 130a, b. This organizational scheme is then transformed into the transaction modules 1000x-z generated by the workflow aligner 110.

Figure 10:
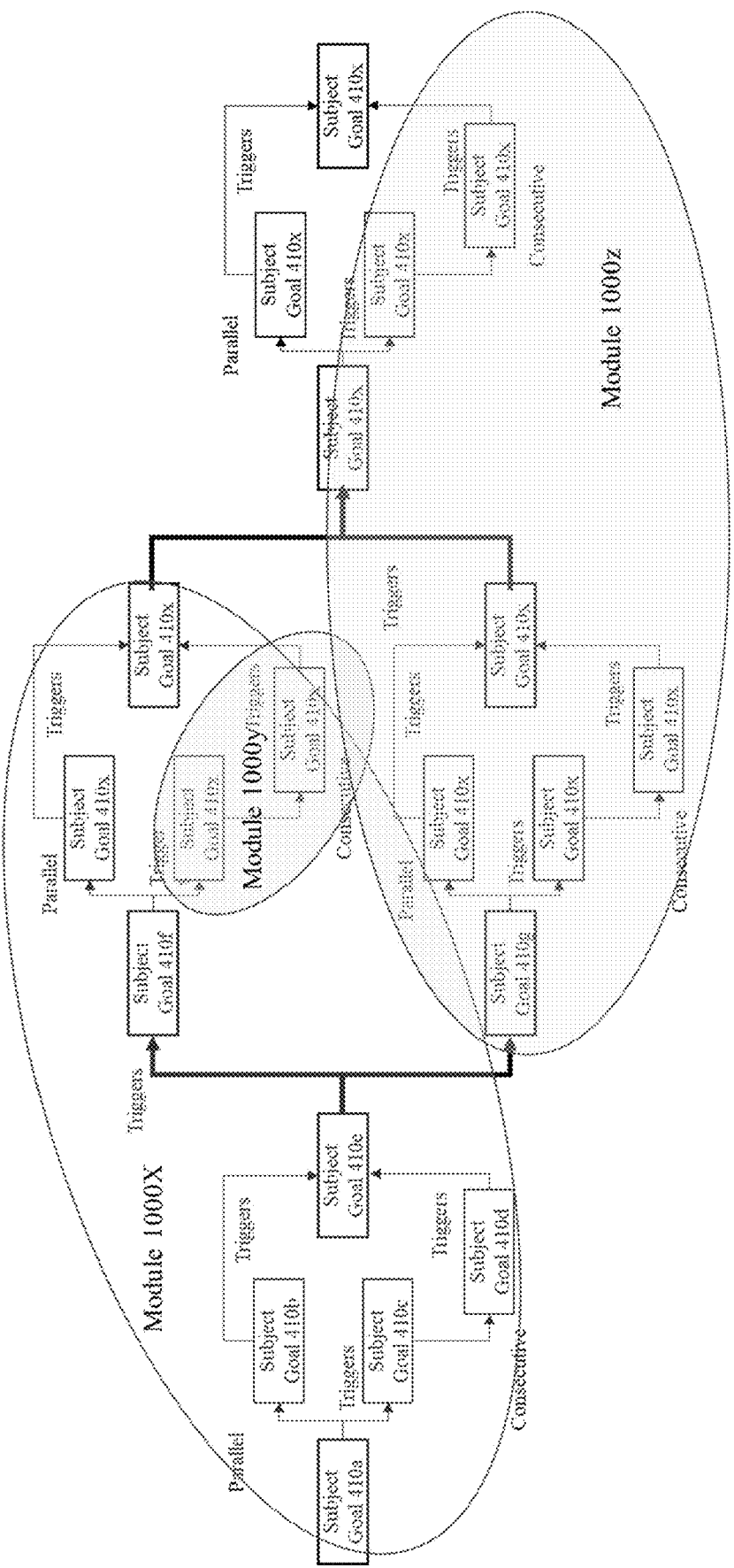
FIG. 10 illustrates the definition of a transaction module based on the relationships illustrated in FIG. 9.

FIG. 10 illustrates the definition of transaction module 1000x-z based on the relationships illustrated in FIG. 9. As shown, each module 1000x-z is defined such that a single subject goal 410e, 410f may act as a trigger for initiating the corresponding transaction module. Once the transaction modules 1000x-z have been defined, the sequencing of the plurality of subject goals 410a-f, x at (290) will have defined sequence relationships between any possible pair of subject goals of a particular transaction module 1000x. Accordingly any pair of subject goals 410a-f, x within a transaction module 1000x will either be defined as consecutive, and therefore one will have the other as a defined prerequisite, or parallel.

Returning now to FIG. 2, once the workflow aligner has generated (at 300) the transaction modules 1000, the modules can either be executed (at 310), or, in some embodiments, the transaction modules 1000x-z may undergo additional organization (at 320) in order to sequence the transaction modules. If the particular implementation of the method proceeds with executing the modules (310), the method may first identify (330) subject goals 410a-f, x within an available transaction module 1000x for which all prerequisites have been completed. This may be, for example, by identifying a first subject goal 410a that does not have prerequisites, or it may be by determining which subject goals 410g (in transaction module 1000z) have prerequisites that are fully satisfied such as, for example, by being part of a previously completed transaction module 1000x. For any subject goal 410a-g, x identified (at 330) as available, at least one action item 800 is available, and the method proceeds by communicating (at 340) available action items 800 to corresponding network partners 450a-f.

Once an action item 800 is communicated (at 340) to an appropriate partner 450a-f, such partner may be granted (350) limited access to the particular action item 800 in a platform implementing the method, and execute (360) the particular action item 800. Typically, once a network partner 450a-f completes a tasked action item, the limited access provided would be withdrawn. Once the action item 800 is confirmed to be complete, which may be by confirmation from the network partner 450 a-f or by an external confirmation, or by a direct party 130a, b the method then determines (370) if the pending subject goal 410a-g, x contains any further action item 800 that requires completion. If any further action items 800 are available within the subject goal 410, the method continues to communicate the same (at 340) to the relevant network partner 450a-f and provide limited access (at 350) for completion of the corresponding action item.

Accordingly, as discussed above, each subject goal 410a-g, x typically comprises a plurality of sequenced action items. In such a scenario, upon the completion of each action item 800, any network partner 450a-f associated with an immediately following action item is alerted, by the communication module, that the corresponding action item is available for completion. Once all action items 800 of a particular subject goal 410a-g, x have been completed, the subject goal itself is defined as complete (380) within the system.

Upon completion of a first subject goal 410a, any further subject goal 410b for which the first subject goal was a prerequisite is checked (390) to determine if all prerequisites have been satisfied. If so, the corresponding subject goal 410b is identified as available (at 330), and the corresponding action items 800 are tasked out.

In some embodiments, completion of certain subject goals 410a-g, x may render other subject goals as moot. Such scenarios may be defined by particular results of the completion of a specific action item 800 within the corresponding subject goal 410a-g, x. For example, the completion of a particular subject goal 410x may be executed in two distinct ways, such as confirmation that a requirement has been satisfied or a requirement for further action. As such, if further action is required, the prerequisites for a secondary subject goal 410 410x defining that further action may be satisfied, and that secondary subject goal may become available for execution. If no further action is required, the secondary subject goal 410x may instead be rendered moot. In such a scenario, the secondary subject goal 410x may be removed from the transaction module 1000x completely, marked as automatically completed, or marked as moot. Once marked as moot or removed, the corresponding subject goal 410x will be considered completed for the purpose of any prerequisite requirements based on that secondary subject goal.

As an example, to be discussed in more detail below, in the context of a real estate transaction, an inspection report executed may indicate that the corresponding property is acceptable as is, or it may indicate that the property requires repairs. If the property requires repairs, subject goals 410x associated with such repairs and approval of the repairs, as well as follow up goals, may be made available. If the property is determined to be acceptable as is, all such follow up repairs are rendered moot.

The method proceeds in this manner until all subject goals within a particular transaction module 1000x have been completed, at which time the corresponding module is itself considered complete. It is noted that if any action item 800 identified during the execution stage has not been assigned a network partner 450a-f necessary for execution, a direct party may define such a network partner by way of the communication module.

In some embodiments, the transaction modules 1000x-z undergo further organization (at 320) before subject goals are tasked out. In such embodiments, the workflow aligner sequences a plurality of transaction modules 1000x-z that have been defined, as shown in FIG. 9. In doing so, the workflow aligner defines (322) a sequence relationship between any pair of transaction modules 1000x-z defined by the system as either consecutive or parallel. For any pair of transaction modules 1000 defined as consecutive, one of the transaction modules 1000x-z is defined (324) as a prerequisite for the other.

Figure 11:
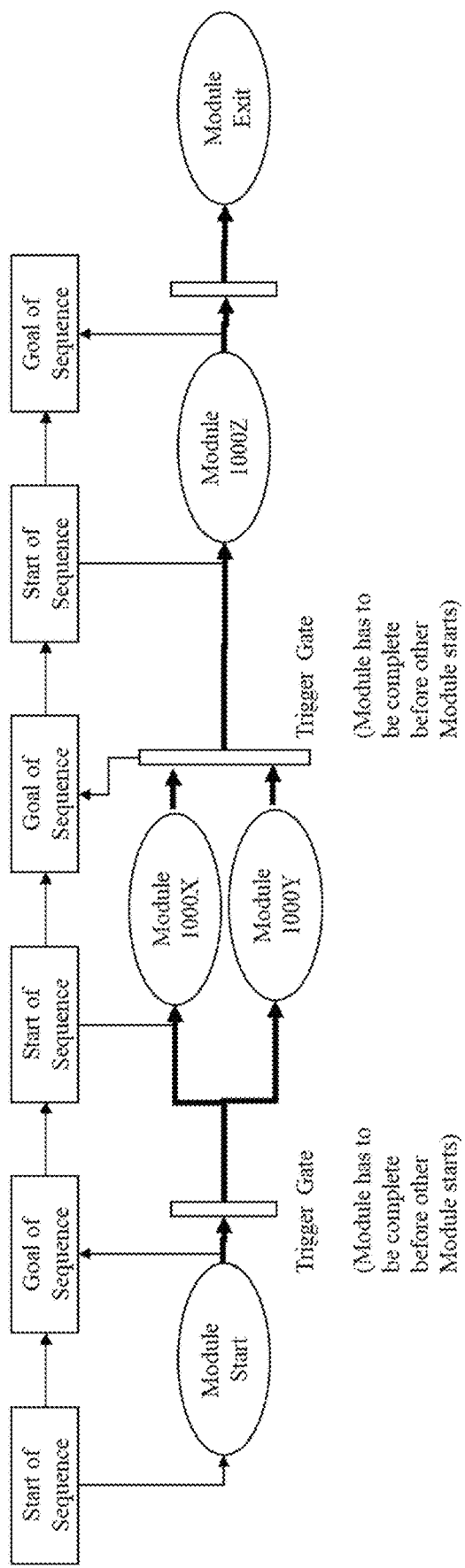
FIG. 11 illustrates the alignment of the transaction modules of FIG. 10.

Accordingly, any particular transaction module 1000 is not available for execution until all prerequisite transaction modules have been completed. FIG. 11 illustrates the alignment of the transaction modules of FIG. 10. In such an embodiment, for example, Module 1000z may not be accessible until both Module 1000x and Module 1000y have been completed.

Returning now to FIG. 2, once prerequisites have been defined (at 324), an available transaction module 1000x is identified (326) and selected for execution. The method then identifies an available subject goal 410a within the transaction module (at 330) and proceeds with execution of all action items 800 within that subject goal 410a. Once all subject goals within a particular transaction module have been completed, the transaction module 1000x is marked as complete, and the method determines if any additional transaction modules 1000y, z are available for execution (at 326). Typically, a transaction module 1000y for which not all prerequisites have been satisfied will not be made available to deal parties.

Once all transaction modules 1000x-z have been completed, the deal has been completed, and the underlying transaction objective has been achieved.

In some embodiments, in the context of the method described, the transaction subjects 400 are defined initially, and may be defined by one or both of the deal parties, or in the deal parameters. The subject goals 410a-g, x may then be defined by either deal parties 130a, b or by network partners 450a-f associated with the corresponding transaction subject 400. In contrast, the transaction modules 1000x-z are generated by the process intelligence engine 100, generally by the workflow aligner 110. As such, the grouping of subject goals 410a-g, x in the transaction modules 1000x-z is different than the grouping of subject goals 410a-g, x in the transaction subjects 400 as initially defined.

Accordingly, a first particular network partner 450a may define a first transaction subject 400 as comprising a first group of subject goals 410a-b and a second network partner 450b may define a second transaction subject 400 as comprising a second group of subject goals 410c-d. However, after the workflow aligner 110 processes the overall transaction, the subject goals 410a-d may be regrouped in order to more logically or more linearly structure the transaction. Accordingly, all subject goals 410a-d may be grouped under a single transaction module 1000X, or they may be divided among transaction modules irrespective of the transaction subjects 400 from which they originated.

Figure 12:
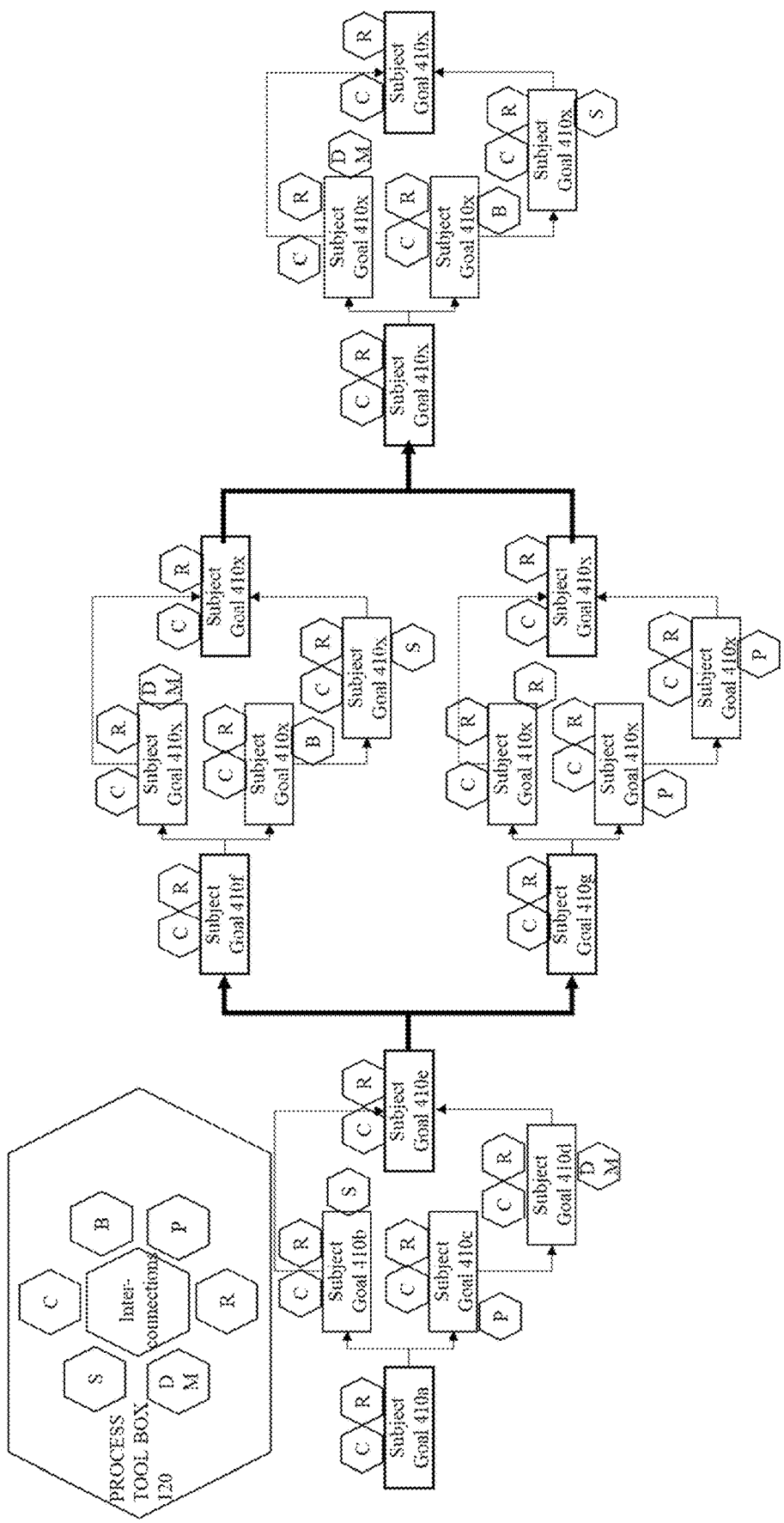
FIG. 12 illustrates the applications of tools from the process tool box to the subject goals of the automated workflow of FIG. 2.

FIG. 12 illustrates the applications of tools from the process tool box 120 to the subject goals 410a-f, x of the automated workflow of FIG. 2. As shown, the process tool box 120 may contain a variety of tools that may be leveraged for the execution of deals in the automated workflow of FIG. 2. For example, as discussed above, a communication tool C may be used by the platform to provide access to and communicate requirements to network partners 450. The process tool box 120 illustrated includes, for example, a communication module C, a scheduling module S, a recordation module R, a document management module DM, a payment module P, and a bidding module B.

Further the recordation module R may be applied at various stages upon the completion of subject goals 410a-g, x to record the completion and maintain records of the transaction. Typically, upon the completion of any subject goal 410, a record of such completion is generated by the recordation module R, and may be stored in a document management system DM.

In some embodiments, the document management system DM maintains a database of data collected by way of the recordation module R, and the method may further comprise analyzing the data in the database to identify potential interaction opportunities between network partners 450a-f based on the data recorded. In such a scenario, such opportunities may be communicated to the network partners 450 by way of the communication module C.

Figure 13:
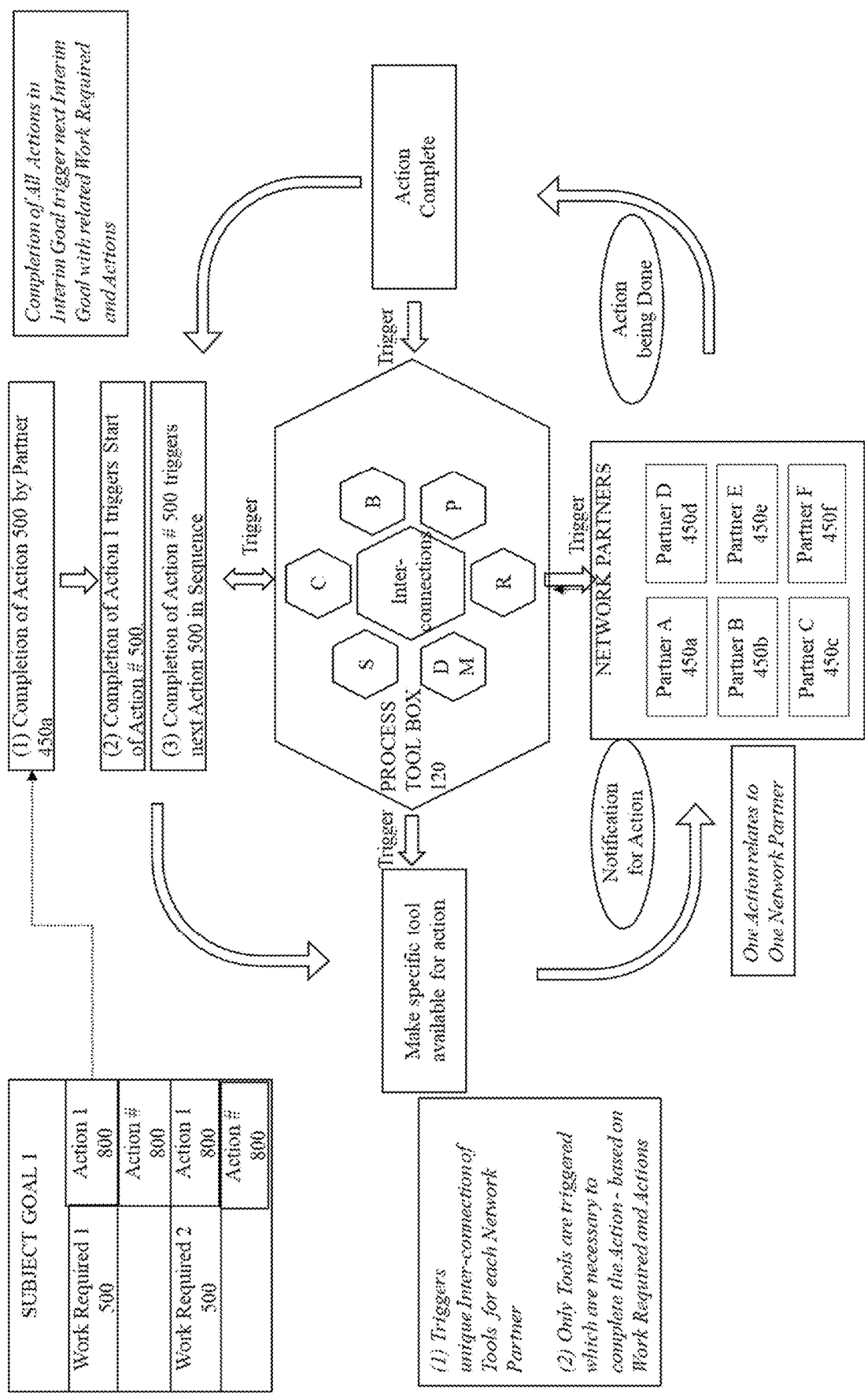
FIG. 13 illustrates a high level schematic diagram illustrating the execution of subject goals in the automated workflow of FIG. 2.

FIG. 13 illustrates a high level schematic diagram illustrating the execution of subject goals in the automated workflow of FIG. 2.

The workflow discussed in reference to FIG. 2 may be applied in a wide variety of contexts and deal types. As one example, the workflow may be applied in the context of a real estate transaction.

Figure 14:
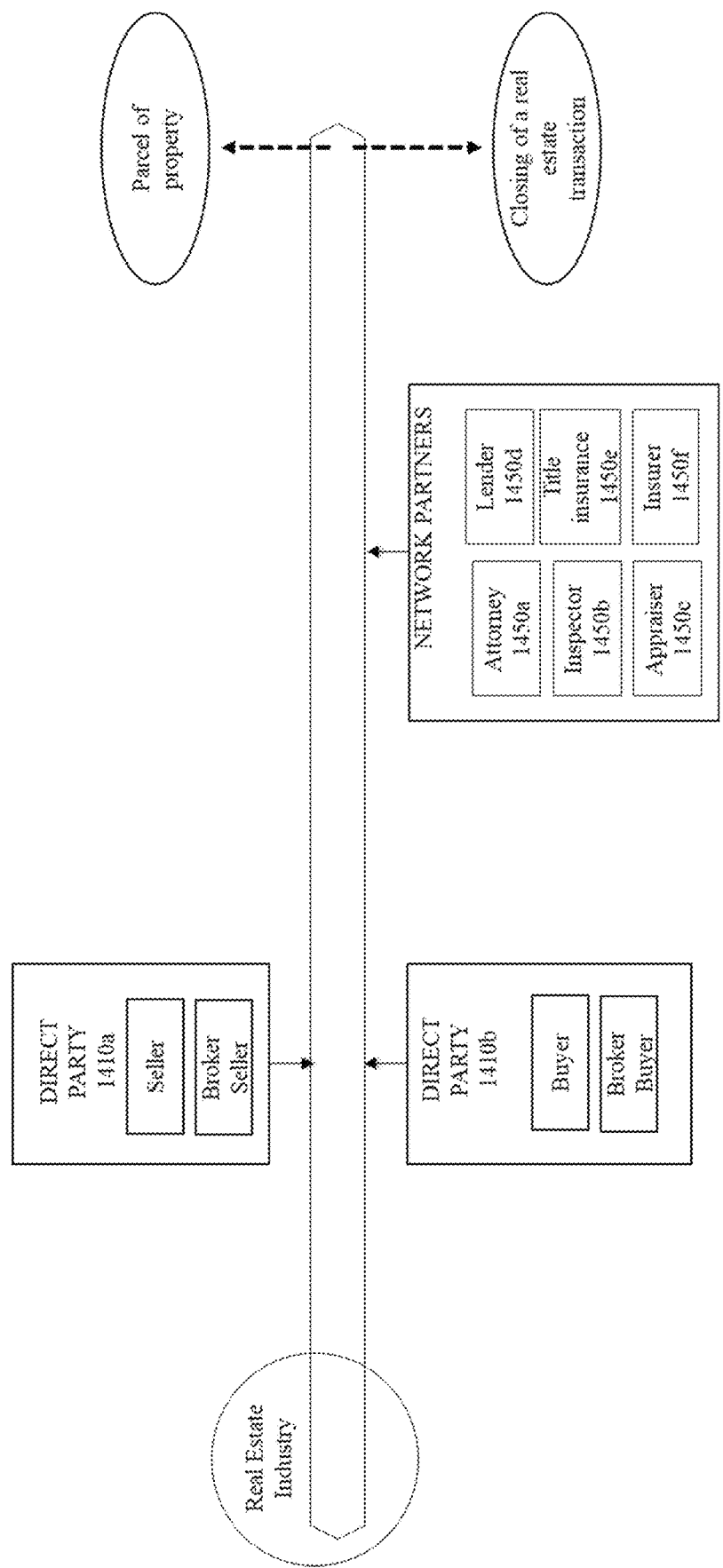
FIG. 14 illustrates a step of identifying network partners for the automated workflow of FIG. 2 in the context of a real estate transaction.

FIG. 14 illustrates a step of identifying network partners for the automated workflow of FIG. 2 in the context of a real estate transaction. As shown, and as discussed above with respect to FIG. 3, initially two deal parties are defined in deal parameters, received by the process intelligence engine 100 (at 210) in this case a seller 1410a and a buyer 1410b. The objective of the deal shown is the purchase or sale of a real estate property, and various network partners 1450a-f are identified to assist with the execution of the deal. Such partners may have specific expertise associated with transaction subjects necessary for execution of the deal, and may include, for example, home inspectors 1450b, mortgage lenders 1450d, title insurance venders 1450e, attorneys 1450a, other insurers 1450f and the like.

Figure 15:
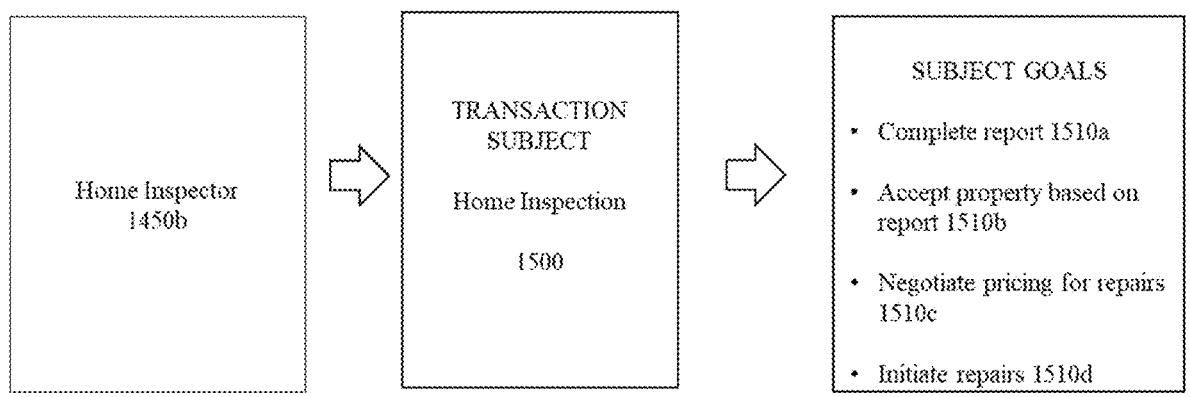
FIG. 15 illustrates a definition of transaction subjects in the context of a real estate transaction implementing the automated workflow of FIG. 2.

FIG. 15 illustrates a definition of transaction subjects 1500 in the context of a real estate transaction implementing the automated workflow of FIG. 2. As discussed above with respect to FIG. 4, the transaction subject 1500, in this case home inspection, may be defined (at 220) by a corresponding network partner, such as the home inspector 1450b. The transaction subject 1500 typically includes a plurality of subject goals 1510a-d that are necessary for completion of that particular transaction subject.

In the context of a real estate transaction, the subject goals 1510a-d underlying the property inspection subject 1500 may include completion of an inspection report 1510a and initiating repairs of deficiencies 1510d. In order to simplify the discussion of the process, only a subset of subject goals are explicitly discussed. However, many additional goals may be defined within a system implementing the method discussed. For example, a home inspection subject 1500 may further include completion of work on property deficiencies, acceptance of property after such work, and legal acceptance, including any further pricing negotiation.

The transaction subject 1500 shown is one of several transaction subjects that combine to facilitate the complete execution of the real estate transaction contemplated by the two parties 1410a, b.

FIG. 16 illustrates a definition of multiple subject goals 1510a-d, x and underlying work tasks for a real estate transaction subject in the context of the automated workflow of FIG. 2. It is noted that multiple subject goals are labeled as 1510x in order to simplify the discussion herein. Accordingly, each of the subject goals 1510 identified in FIG. 15 (at 230) are broken down (at 260) into a set of work tasks, each of which is defined by the work required for completion. For example, the completion of the home inspection report as a subject goal 1510 may comprise work tasks for scheduling visits by a home inspector, conducting and confirming the home visit by the home inspector, and submission of a report by the home inspector.

Figure 17:
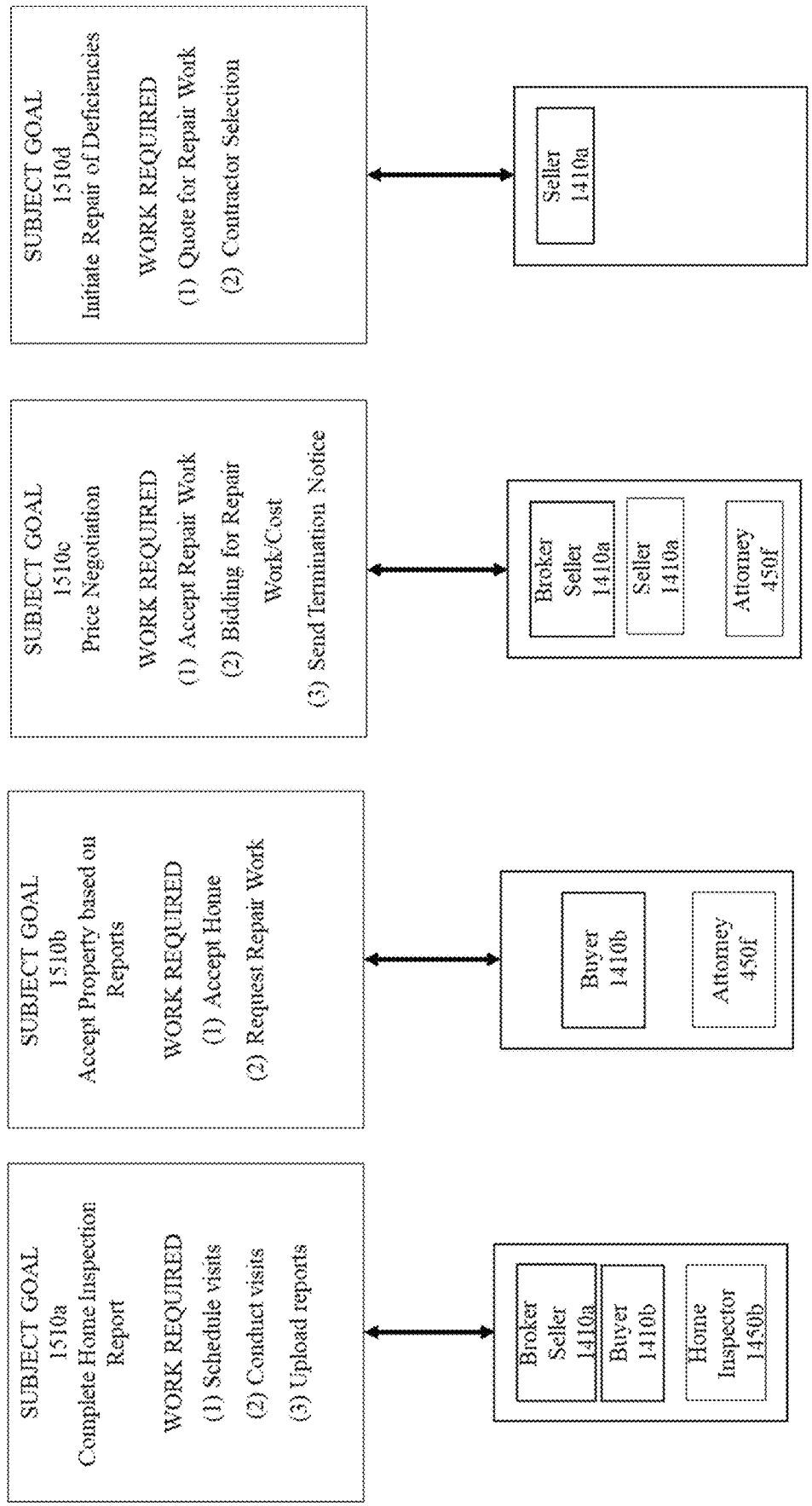
FIG. 17 illustrates a definition of particular network partners for particular subject goals in the context of a real estate transaction leveraging the automated workflow of FIG. 2.

FIG. 17 illustrates a definition and assignment (at 240) of particular network partners 1450a-f for particular subject goals 1510 in the context of a real estate transaction leveraging the automated workflow of FIG. 2. Accordingly, each subject goal 1510 may include work tasks that require the assistance of distinct deal parties or network partners 1450a-f. As discussed above with respect to FIG. 6, the appropriate parties may be associated (at 230) with corresponding subject goals.

Figure 18:
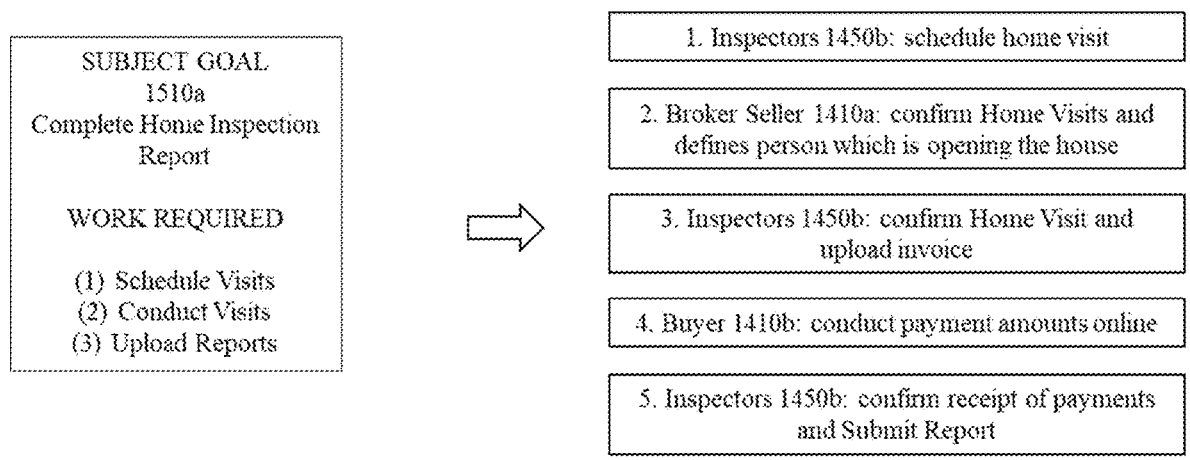
FIGS. 18 and 19 illustrate the definition of particular action items corresponding to work tasks for a particular subject goal and the assignment of network partners or direct parties to particular action items in the context of a real estate transaction leveraging the automated workflow of FIG. 2.
Figure 19:
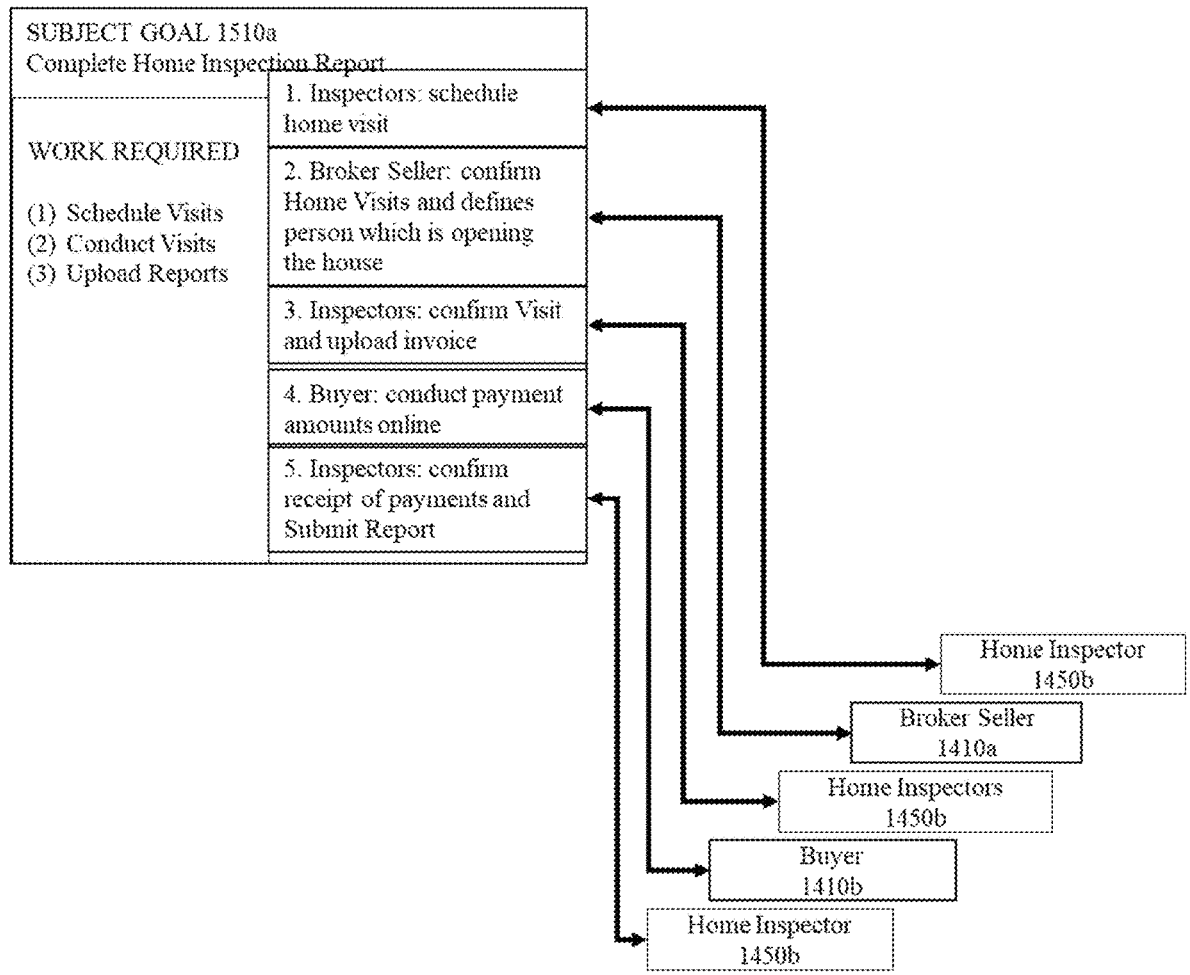

FIGS. 18 and 19 illustrate the definition of particular action items corresponding to work tasks for a particular subject goal and the assignment of network partners or direct parties to particular action items. In some embodiments, prior to assignment of individual tasks to network partners 140a-f, a further division of work tasks into more granular action items is required. As shown, when a subject goal is broken down into work tasks, some such tasks may still require multiple parties for execution.

As shown, the work tasks may be distilled to a series of action items, each requiring the participation of at most a single direct party 1410a, b or network partner 1450a-f. In some embodiments, the list of work tasks shown in FIG. 16 associated with each subject goal corresponds to the list of action items that require execution in FIG. 18.

In some embodiment, some of the work tasks identified must be broken down into more granular action items. Such further distilling is performed until all action items defined require the participation of at most a single party. Accordingly, FIG. 19 illustrates a further division of action items into more granular action items in the context of the real estate transaction of FIG. 13. Accordingly, each action item is ultimately associated with at most one network partner 1450a-f or direct party (at 270).

Figure 20:
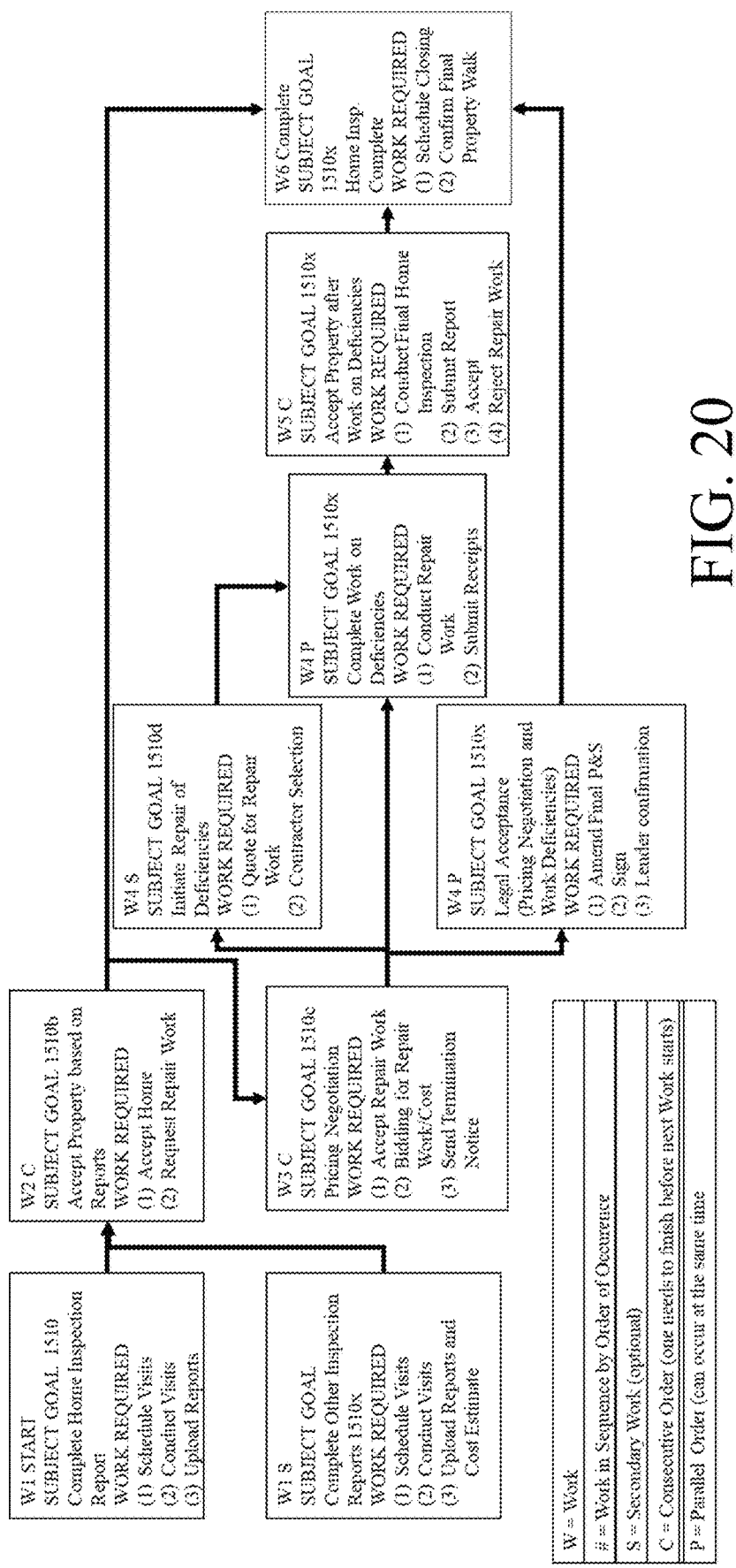
FIG. 20 illustrates the definition of relationships between subject goals for a real estate transaction in the context of the automated workflow of FIG. 2.

FIG. 20 illustrates the definition of relationships between subject goals 1510a-d, x for a real estate transaction in the context of the automated workflow of FIG. 2. As discussed above with respect to FIG. 9, relationships between subject goals 1510a-d, x are either consecutive, such that one subject goal is a prerequisite to the other, or parallel, such that neither subject goal requires the other subject goal prior to execution. Accordingly, the method of FIG. 2 identifies (at 280) prerequisite goals and assigns such prerequisites to each subject goal 1510a-d, x, resulting in the mapping shown in FIG. 20.

For example, the completion of the home inspection report may be a first subject goal 1510a and the initiating of repairs of deficiencies 1510d may be a secondary subject goal 1510. Accordingly, only after completing all action items in the first subject goal 1510a is the secondary subject goal 1510d made accessible. At that time, a network partner associated with the first action item for the secondary subject goal in this case the initiating of repairs of deficiencies may be identified and alerted of the corresponding action item.

As discussed above, completion of certain subject goals 1510b may render other subject goals 1510c, d moot. For example, subject goal 1510b allows for the acceptance of property based on already provided reports. If, for example, the relevant direct party chooses to accept the property, there is no need to continue to W3 C and W3 C, such that subject goals 1510c and d are never completed. As such, those subject goals, as well as the subject goals 1510 following W3 C are all marked as moot or complete. As such, the deal proceeds directly to subject goal 1510x at W6 allowing for the completion of the home inspection module of a deal.

Figure 21:
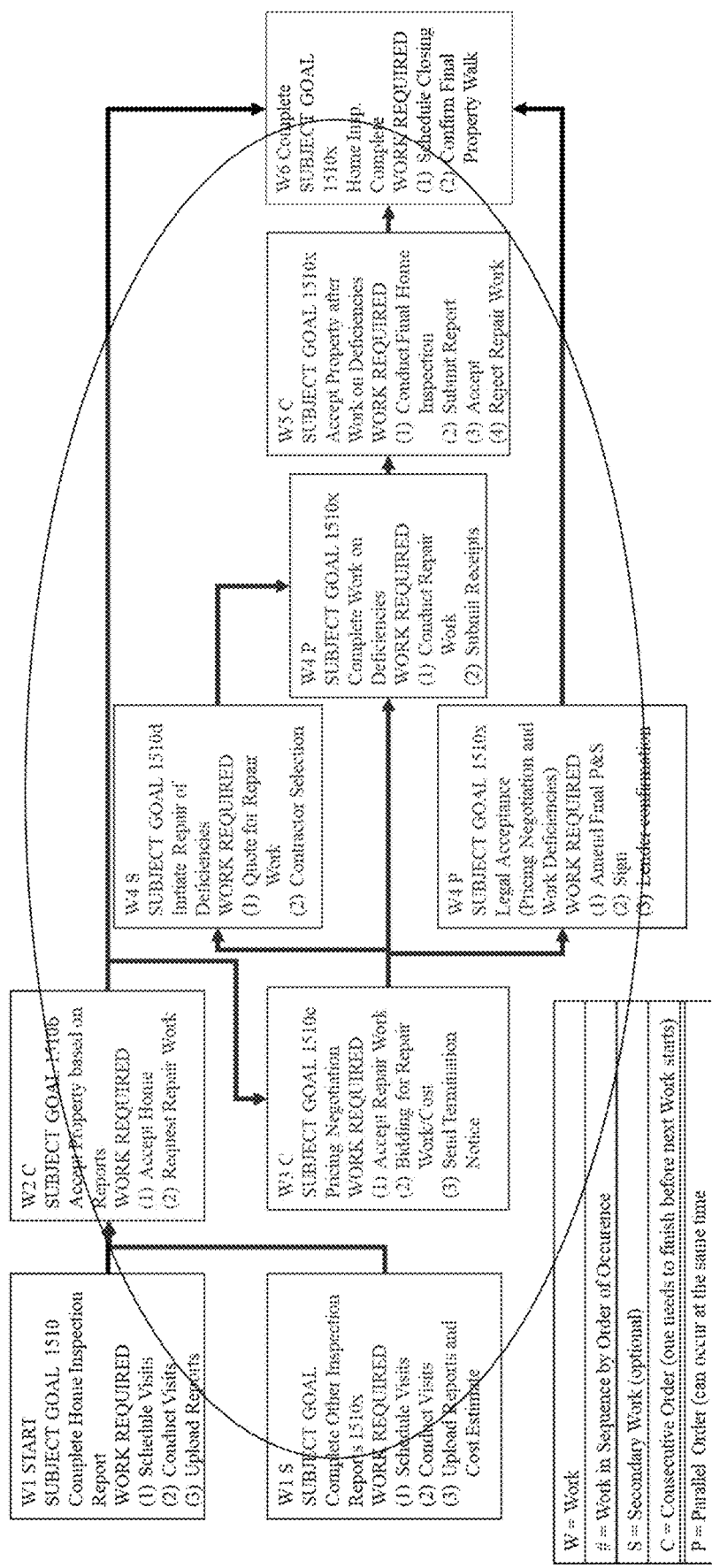
FIG. 21 illustrates the definition of a transaction module for a real estate transaction based on the sequencing of subject goals illustrated in FIG. 9.

Once all subject goals 1510 have been defined in terms of their relationships to other subject goals, the workflow aligner sequences the corresponding goal (at 290) and the workflow aligner proceeds to generate (at 300) a plurality of transaction modules. FIG. 21 illustrates the definition of a transaction module for a real estate transaction based on the relationships illustrated in FIG. 21. As shown, the transaction module defined, namely the Home Inspection module, is fully self contained and can be executed independently of other modules.

Figure 22:
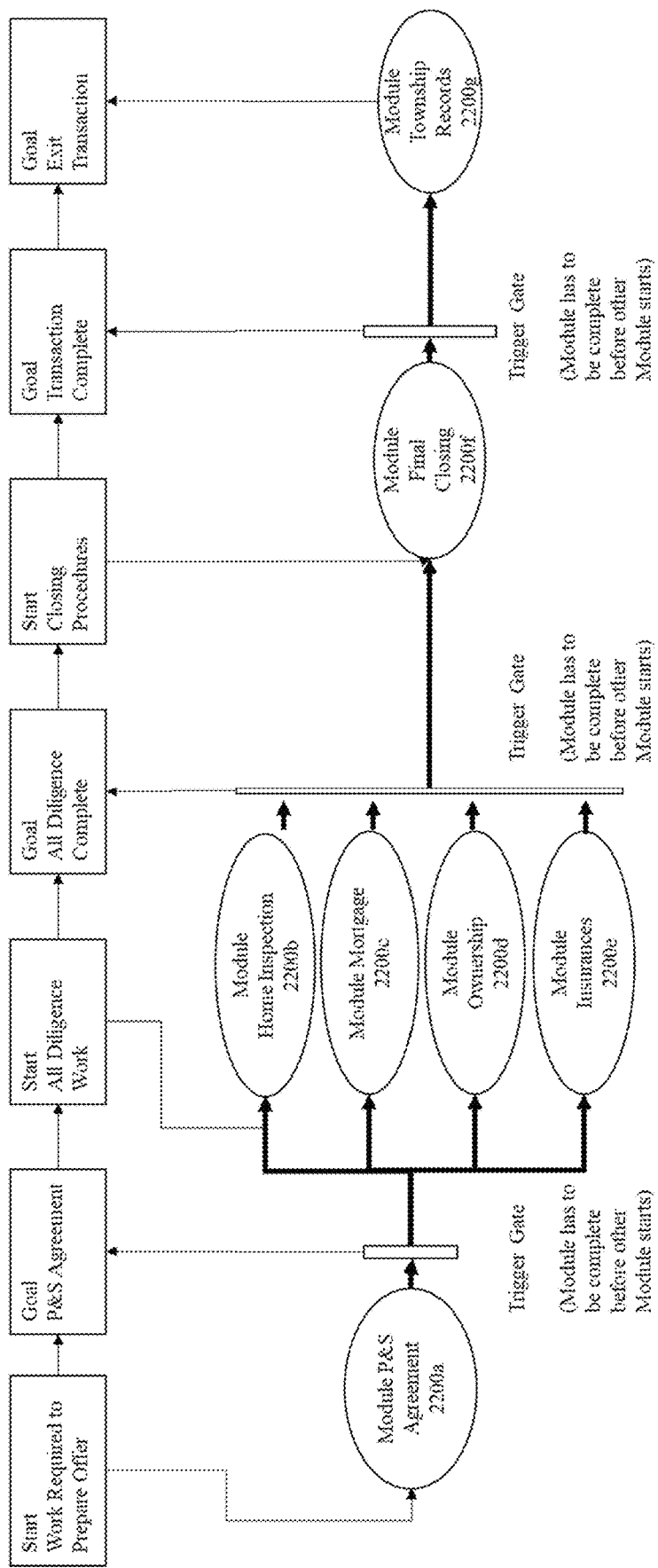
FIG. 22 illustrates the alignment of the transaction module of FIG. 21 with additional transaction modules.

FIG. 22 illustrates the alignment of the transaction module of FIG. 21 with additional transaction modules 2200a-g. As shown, all such modules are performed either consecutively, as in the case of the home inspection module 2200b and the P&S agreement module 2200a, or are performed in parallel, as in the case of the home inspection module 2200b and the mortgage module 2200c. Similarly, a final closing module 2200f may not be accessible until the completion of the mortgage module 2200c, as the mortgage module may be defined as a prerequisite for the final closing module.

In some embodiments, during execution of a deal leveraging the systems and methods described, after sequencing the plurality of subject goals, a user may be presented with all subject goals having no prerequisite subject goals in order to initiate the execution of the deal.

Further, as subject goals are completed, all subject goals for which all subject goals have been completed may be presented to the user at a user interface. Such subject goals may be presented to the user alone, as a listing of tasks to be performed, or may be presented to the user in the visual context of the overall transaction.

In such embodiments, the deal parties may be presented with a display of all subject goals in the context of the transaction, with accessible subject goals marked as such. In contrast, network partners may be presented only with subject goals or action items for which they have been provided limited access.

The method described may be implemented in various contexts. Accordingly, as discussed, the method described may be used by brokers in the real estate broker industry as a user or as part of the transactional network of another user to expand its core business of mortgage lending by utilizing single source direct access to other network partners and thus decreased transaction time of business network partners involved in the real estate buying process and increasing transaction volume.

In another example, a method allowing the legal business as user or part of the transactional network of another user to expand its core business of legal services by utilizing single source direct access to other network partners and thus a larger customer base resulting in decreased transaction time and increased legal service volume.

The process intelligence engine combines several unique aspects to enable the complex transaction: (1) the integration of a set of independent transaction network participants that are necessary for the transaction, (2) the alignment and sequencing of workflows which is customizable for each specific industry requirements, (3) the translation of workflows into actions, thereby designating and assigning the actions to the transaction network, (4) the interconnection of the transaction network with the required actions, and (5) the creation of a unique interconnectivity between all workflow alignments and necessary digital tools to optimize and complete the transaction cycle, using specific coding sequences to automatically trigger the actions indicated in items #3 and #4.

As such, the process intelligence engine creates a unique solution in the form of automation and optimization for any type of transactional activity, thereby differentiating itself from existing systems which only offer individual, non-interconnected tools as part of a non-automated and non-optimized task, or project management interface to better overview a current status of projects.

The method further allows all integral participants to benefit from the use of the process intelligence engine, for the following reasons: (1) It simplifies the inherent complexity of transaction processes, (2) it reduces the time needed for a single transaction, (3) it reduces the cost for the transaction, (4) it increases the transaction velocity, and (5) it creates ultimate transparency of the entire workflow based on immutable ledgers.

The method, as a result, creates a way to establish an interconnection between a network, a process and a digital tool platform to facilitate and complete complex transactions on one single platform.

One advantage of the described system and method is the customization of any related or necessary work for any transaction objective in any business industry into subject goals, then translate these subject goals into work required and then into executable action items, then assign these action items to the transaction network—via the workflow aligner 110—and then use of uniquely interconnected process tools, including a database, a finance tool, a scheduling manager, a bidding platform, and a communications tool—the process tool box 120, to optimize and complete the transaction cycle.

The workflow aligner 110 as part of the process intelligence engine 100 allows a transaction host to create and invite relevant transaction network partners, establish a secure and verifiable communication platform between the transaction host and the transaction partners, and enables the transaction host to identify, create, and assign pre-determined workflow tasks for all network participants. The transaction host described may be one of the deal parties 130a, b discussed above. In some embodiments, both deal parties may be given access to the system as a host of the transaction.

The process tool box component as part of the process intelligence engine functions as the facilitator for the workflow alignment and the completion of workflow actions by the transaction network using automated functions for task execution, blockchain technology for security and verifiability, and analytic technology for feedback The process tool box contains specific tools activated as needed to complete the action and are specific for each action according to the transaction cycle set-up. As key aspect, these tools are required to interact with each other, based on triggers from transaction units and its related actions. A simple API connection would not render the same result as it only connects the tools without processing and sequencing capabilities.

The process tool box as part of the process intelligence engine integrates and interconnects multiple coexisting digital tools needed for the completion of the transaction cycle, including, but not limited to, Account Management, Database, Finance/Payment System, Scheduling Manager, Bidding Platform, and Communications. The interconnection for these digital tools is one of the basic elements for the functionality, the automation and guidance, during the completion of the transaction cycle.

Furthermore, the process intelligence engine is enabled to use a cryptographical verification process in which all activities that occur within the transaction cycle are recorded in an immutable way.

In addition, an artificial intelligence engine may be added as a medium for process analytics and cognitive learning in order to optimize and for secure documentation carried out by blockchain or a blockchain enabled ledger system. It will be understood that all activities, including workflows from network participants and workflows within the process intelligence engine, may use blockchain enabled ledger technology to create an immutable ledger system to provide security and verifiability for compliance across the network.

The method, as a result, creates a way to establish an interconnected network and, process and digital tool platform to facilitate and complete complex transactions in one single platform.

Furthermore, the basic configuration of the product enables a nearly unlimited scalability of transaction networks across geography and industry.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

The embodiments of the invention disclosed herein may comprise a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device may receive computer readable program instructions from the network and forward the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, Java, Perl, Python or the like, and conventional procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and/or computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A processor or processor circuitry may include a device that has any combination of hardware, circuitry, and software. The hardware and circuitry examples may comprise a parallel processor, a processor array, a vector processor, a scalar processor, a multi-processor, a microprocessor, a communication processor, a network processor, a logic circuit, a queue management device, a central processing unit (CPU), a microprocessing unit (MPU), system on a chip (SoC), a digital signal processor (DSP), an integrated circuit (IC), an application specific integrated circuit (ASIC), a programmable logic device (PLD), and a field programmable gate array (FPGA). A processor or processor circuitry may include one or more processors, one or more circuits and/or software, that responds to and processes basic computer instructions and carries out the instructions of a computer program by performing the basic arithmetic, logical, control and input/output (I/O) operations specified by the instructions, one or more of: an arithmetic logic unit (ALU), which may carry out arithmetic and logic operations on the operands in instructions; a floating point unit (FPU), also known as a math coprocessor or numeric coprocessor, which is a specialized coprocessor that may manipulate numbers more quickly than the basic microprocessor circuitry can in some cases; one or more registers, which may hold instructions and other data and supply operands to the ALU and store the results of operations; and cache memory, which may save time compared to having to get data from random access memory (RAM). A processor or processor circuitry may also include one or more circuits comprising electronic components, such as resistors, memristors, power sources, magnetic devices, motors, generators, solenoids, microphones, speakers, transistors, capacitors, inductors, diodes, semiconductors, switches, antennas, transducers, sensors, detectors, vacuums, tubes, amplifiers, radio receivers, crystals, and oscillators connected by conductive wires or traces through which electric current can flow. The combination of components and wires may allow various simple and complex operations to be performed: signals may be amplified, computations can be performed, and data can be moved from one place to another.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A computer-based method for managing a transaction comprising:
    providing a process intelligence engine, the process intelligence engine comprising a workflow aligner and a process tool box,
    receiving deal parameters at the process intelligence engine, the deal parameters defining an objective of the transaction and at least two direct parties to the transaction
    defining a plurality of transaction subjects, each requiring the participation of at least one network partner, wherein each transaction subject is a requirement for achieving the objective of the transaction;
    defining, for each transaction subject, a plurality of subject goals to be addressed by the at least one network partner;
    defining, for each subject goal, at least one action item required for satisfying the corresponding subject goal, wherein each action item is associated with at most one network partner;
    identifying, for at least one subject goal, at least one prerequisite subject goal that must be completed before beginning the corresponding subject goal;
    sequencing, by the workflow aligner, the plurality of subject goals such that at least one secondary subject goal of the plurality of subject goals is not accessible to users or network partners until completion of any prerequisite subject goal associated with the secondary subject goal;
    generating, by the workflow aligner, a plurality of transaction modules based on the sequencing of the subject goals, each transaction module comprising a plurality of the subject goals;
    upon completion of a first subject goal, identifying a network partner associated with an action item of a second subject goal for which the first subject goal was a prerequisite, and alerting the network partner of the corresponding action item using a communication module of the process tool box,
    upon completing of any subject goal, identifying any subject goals for which all prerequisites have been satisfied and alerting, by the communication module, any network partner associated with a first action item for each identified subject goal that the corresponding action item is available for completion,
    wherein the sequencing of the plurality of subject goals comprises defining a sequence relationship between all possible pairs of subject goals of a particular transaction module as either consecutive or parallel, wherein for each consecutive pair of subject goals, one such subject goal is defined as a prerequisite associated with the other subject goal,
    wherein at least one subject goal comprises a plurality of sequenced action items, and wherein upon completion of each action item, any network partner associated with an immediately following action item is alerted, by the communication module, that the corresponding action item is available for completion,
    wherein the at least one subject goal is defined as complete upon the completion of all action items of the subject goal, and
    wherein the at least one subject goal may define at least one secondary subject goal as complete in the event that an outcome defined in the subject goal renders the corresponding second subject goal moot.

2. The method of claim 1, wherein, if no network partner is associated with a particular action item, and the action item requires input from a third party, at least one of the two direct parties may associate a network partner with the corresponding action item using the communication module.

3. The method of claim 1, wherein, upon receiving an alert for a particular action item, a network partner is provided with limited access to the transaction, and upon indicating completion of the corresponding action item, the limited access to the transaction is withdrawn from the network partner.

4. The method of claim 1, wherein, upon completion of all subject goals of a particular transaction module, the method defines the particular transaction module as complete.

5. The method of claim 1, wherein the process tool box further comprises a recordation module for maintaining records of the transaction, and wherein upon completion of any subject goal a record of such completion is generated by the recordation module and is stored in a document management system.

6. The method of claim 5, wherein the document management system maintains a database of data collected by way of the recordation module, the method further comprising analyzing the data in the database to identify potential interaction opportunities between network partners.

7. The method of claim 1 further comprising:
sequencing, by the workflow aligner, the plurality of transaction modules, and wherein the sequencing of the plurality of transaction modules comprises:
defining a sequence relationship between any pair of transaction modules, as either consecutive or parallel, wherein for each consecutive pair of transaction modules, one such transaction module is defined as a prerequisite to the other transaction module.

8. The method of claim 7, wherein a specified transaction module is not accessible to users until the completion of all prerequisite transaction modules for the specified transaction module.

9. The method of claim 8, wherein each transaction module is defined as complete upon the completion of all subject goals defined for the corresponding transaction module.

10. The method of claim 1, wherein the plurality of transaction subjects are defined in the deal parameters or by one of the at least two direct parties to the transaction, and wherein the transaction modules are generated by the process intelligence engine, and wherein the transaction modules contain different groupings of subject goals than the transaction subjects.

11. The method of claim 1, wherein the transaction is a real estate transaction between the two direct parties, and the network partners include at least one attorney, at least one home inspector, and at least one mortgage lender.

12. The method of claim 11, wherein a first transaction module is a real estate property inspection subject, and wherein subject goals include completion of an inspection report and initiating repairs of deficiencies, and wherein the completion of the home inspection report comprises action items for scheduling visits by a home inspector, confirming the home visit by a direct party, conducting and confirming the home visit by the home inspector, conducting payment for the home visit by a direct party, and submission of a report by the home inspector.

13. The method of claim 12, wherein the completion of the home inspection report is the first subject goal and the initiating of repairs of deficiencies is a secondary subject goal, and upon completion of all action items of the first subject goal, a network partner associated with a first action item of the initiating of repairs of deficiencies is identified and alerted of the corresponding action item.

14. The method of claim 12, wherein a second transaction module is a mortgage module and a third transaction subject is a final closing subject, and wherein the mortgage module is a prerequisite of the final closing subject, such that the final closing subject and any subject goals associated with the final closing subject are inaccessible until the completion of the mortgage module.

15. The method of claim 12, wherein a first transaction module comprises at least one subject goal of the first transaction subject and at least one subject goal of a second transaction subject.

* * * * *